United States Patent
Jimenez et al.

(10) Patent No.: US 10,427,631 B1
(45) Date of Patent: Oct. 1, 2019

(54) VEHICULAR ADAPTATION FOR IMPACT MITIGATION

(71) Applicant: Zoox, Inc., Menlo Park, CA (US)

(72) Inventors: Joshua Jimenez, San Francisco, CA (US); Adriano Di Pietro, San Carlos, CA (US); Andrew Piper, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 79 days.

(21) Appl. No.: 15/431,361

(22) Filed: Feb. 13, 2017

(51) Int. Cl.
| G06F 7/00 | (2006.01) |
| G06F 17/00 | (2019.01) |
| B60R 19/02 | (2006.01) |
| B60R 19/34 | (2006.01) |
| B60R 21/0134 | (2006.01) |
| B60R 21/0136 | (2006.01) |
| B60R 21/01 | (2006.01) |
| B60R 19/40 | (2006.01) |
| B60R 21/34 | (2011.01) |

(52) U.S. Cl.
CPC .......... *B60R 19/40* (2013.01); *B60R 21/0134* (2013.01); *B60R 21/34* (2013.01); *B60R 2021/01013* (2013.01); *B60R 2021/343* (2013.01)

(58) Field of Classification Search
None
See application file for complete search history.

(56) References Cited

U.S. PATENT DOCUMENTS

| 9,725,060 | B1 * | 8/2017 | Daniel | B62D 21/15 |
| 9,802,568 | B1 | 10/2017 | Larner | |
| 2005/0021192 | A1 * | 1/2005 | Takafuji | B60R 21/0136 701/1 |
| 2009/0020353 | A1 * | 1/2009 | Kiribayashi | B60R 19/20 180/274 |
| 2010/0191401 | A1 * | 7/2010 | Mack | B60R 21/0132 701/31.4 |
| 2012/0187616 | A1 * | 7/2012 | Friedrich | B60R 19/34 267/140.13 |
| 2013/0179041 | A1 * | 7/2013 | Loosen | B60R 19/34 701/45 |
| 2017/0043735 | A1 * | 2/2017 | Yamaguchi | B60R 19/483 |
| 2017/0154241 | A1 * | 6/2017 | Shambik | B60R 1/00 |

FOREIGN PATENT DOCUMENTS

DE  10245982 A1 *  4/2004  ............. B60R 19/00

* cited by examiner

*Primary Examiner* — Thomas G Black
*Assistant Examiner* — Demetra R Smith-Stewart
(74) *Attorney, Agent, or Firm* — Lee & Hayes, P.C.

(57) ABSTRACT

A vehicle adaptation system for impact mitigation may include an adjustable element. Additionally, in some examples, the vehicle adaptation system may include a fixed element comprising a substantially pliable material. The vehicle adaptation system may be configured to modify a rigidity of a vehicle body by modifying a stiffness and/or a position of the adjustable element coupled thereto. The vehicle adaptation system may modify stiffness and/or position of the adjustable element based on one or more parameters associated with an operation of the vehicle, in order to enhance the safety of vehicle occupants and/or pedestrians proximate to the vehicle.

29 Claims, 9 Drawing Sheets

VEHICULAR ADAPTATION FOR IMPACT MITIGATION

BACKGROUND

Safety is an important consideration in the design and construction of vehicles. Among the many things to consider in a vehicle safety analysis are the expected hazards in various operational domains, such as encounters with other vehicles and pedestrians. Many designs focused on enhancing occupant safety, such as increasing a size of a vehicle or the size of a fixed crash structure, can have detrimental effects on vehicle efficiency and can present a greater risk to pedestrians.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
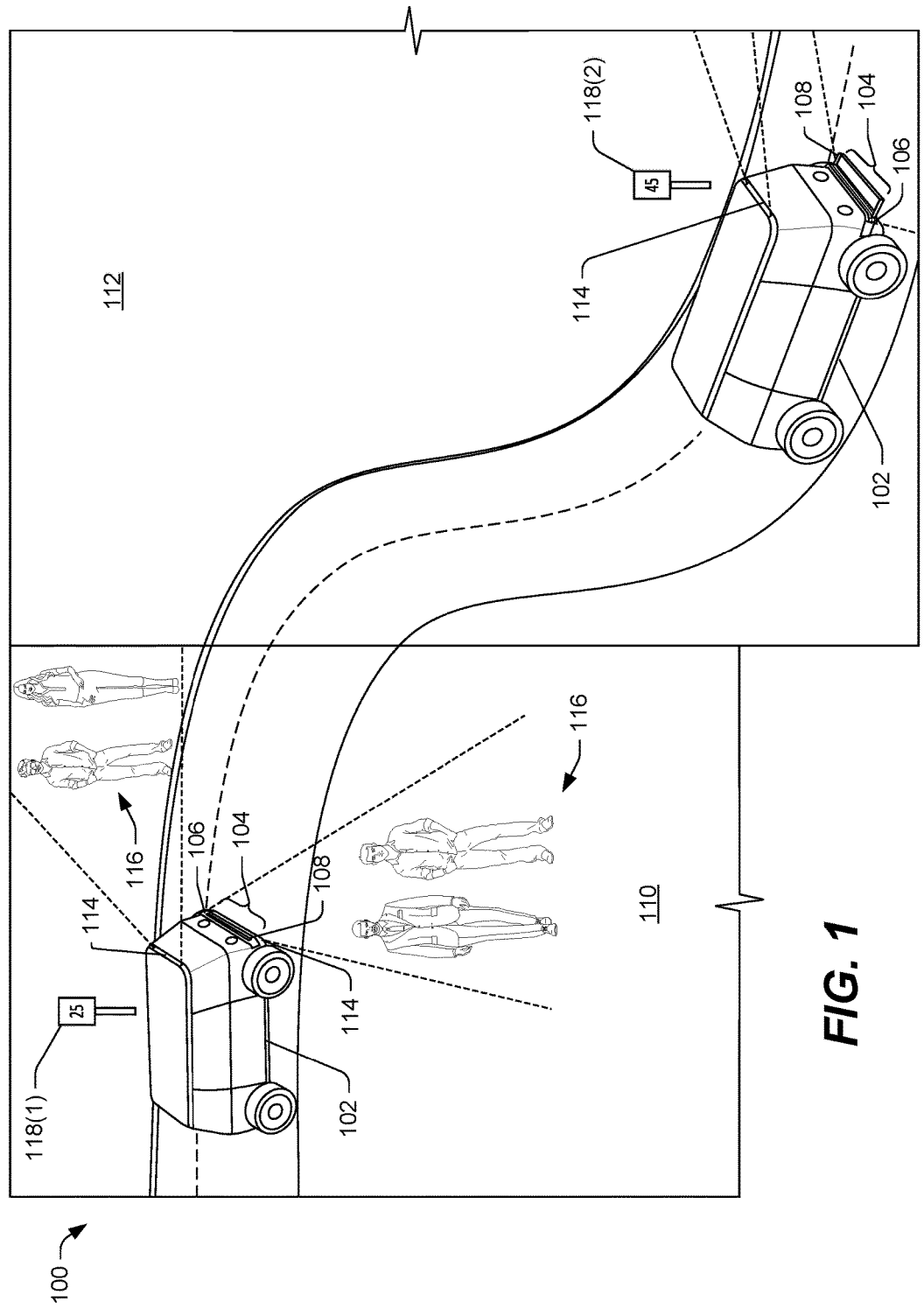
FIG. 1 is an example environment in which a vehicle adaptation system may be used.

As discussed above, many vehicle design features, such as size and shape of a vehicle, may enhance occupant safety, while potentially decreasing the safety of a pedestrian in the event of an encounter with the vehicle. This disclosure is generally directed to techniques and devices for adapting a rigidity and/or structure of a vehicle (e.g., vehicle body) to enhance the safety of both the occupants and pedestrians. In some examples, the rigidity and/or structure of the vehicle may be adjusted based at least in part on operating conditions and/or surroundings of the vehicle.

The vehicle adaptation system may include an adaptive structure configured to modify the rigidity of the vehicle to protect occupants and/or pedestrians. In some examples, the adaptive structure may include a pliable fixed element and a substantially rigid adjustable element having a rigidity (or stiffness) greater than the pliable fixed element. The pliable fixed element may comprise foam, rubber, plastic, silicone, metal (e.g., aluminum or other relatively "soft" or ductile metal), or another deformable material configured to absorb impact forces and increase pedestrian safety. For example, a vehicle adaptation system may determine that a vehicle is located in a zone with a high density of pedestrians and/or an increased likelihood of impact with a pedestrian. As such, the vehicle adaptation system may retract the adjustable element, so that any potential encounter with a pedestrian would be with the pliable fixed element. Upon impact, the pliable fixed element would absorb impact forces, and decrease the likelihood of significant pedestrian injury.

In various examples, the vehicle adaptation system may modify the rigidity of the vehicle by adjusting a rigidity or stiffness setting of the adjustable element. In such examples, the adjustable element may comprise a damper, an electromagnetic shock absorber (e.g., an absorber with magnetorheological fluid), or the like. In some examples, the adjustable element may be configured to adjust a rigidity or stiffness based on impact and/or changes in momentum. In some examples, the vehicle adaptation system may modify the rigidity of the vehicle by modifying a position of the adjustable element between a retracted (e.g., stowed) position and one or more extended (e.g., deployed) positions. The modification may be based on one or more parameters (e.g., factors), such as a location of the vehicle, a velocity of the vehicle, a perception of a pedestrian or other living objects (e.g., pedestrians, cyclists, skateboarders, animals, etc.) in proximity to the vehicle, and/or other parameters. The adjustable element may be extended and/or retracted by one or more actuators (e.g., mechanical actuators, pneumatic actuators, hydraulic actuators, electric actuators, magnetic actuators, pyrotechnic actuators, etc.). The adjustable element may be extended to provide a structure to absorb impact forces and protect occupants upon impact with another vehicle. Additionally or alternatively, the fixed, pliable element may be configured to be extended and/or retracted by one or more actuators. For example, the vehicle adaptation system may determine that the vehicle is traveling on a freeway or other location with low likelihood of encountering pedestrians or other living objects, and may extend the adjustable element to an extended position that is better able to absorb larger amounts of energy, such as those associated with collisions with another vehicle. Upon impact with another vehicle, the adjustable element can absorb a substantial amount of the impact forces, thereby decreasing impact forces transferred to the occupants.

In some examples, the vehicle adaptation system may modify the rigidity of the vehicle based on a calculated magnitude of potential forces in an impact scenario, and an effect of the potential forces on an occupant and/or pedestrian. The position and/or stiffness of the adjustable element may be based on one or more vehicle parameters (e.g., factors) related to the vehicle, such as a speed, a number of occupants, a location of the occupants in the vehicle, a location of the vehicle (e.g., on a freeway, in a school zone, near a blind intersection, etc.), or the like. Additionally or alternatively, the modification of the rigidity of the vehicle may be based on one or more environmental parameters (e.g., factors), such as a detection of pedestrians (e.g., a human or other living object), a time of day, a day of the week, weather conditions, relative speed of other vehicles, or the like.

In various examples, the vehicle adaptation system may modify the rigidity of the vehicle based on one or more vehicle and/or environmental parameter conditions (e.g., speed exceeds 35 MPH, a pedestrian is detected, etc.) being satisfied. In such examples, the vehicle adaptation system may detect a triggering event of the condition being satisfied, and may extend and/or retract the adjustable element accordingly. For example, the vehicle adaptation system may be configured to extend the adjustable element above 35 MPH. Responsive to input data that the vehicle has accelerated through the threshold speed of 35 MPH, the vehicle adaptation system may extend the adjustable element.

In some examples, the vehicle adaptation system may modify the rigidity of the vehicle on demand based on a likelihood of encounter with a pedestrian and/or other vehicle and/or a likelihood of injury to the pedestrian and/or occupants of the vehicle. In such examples, the likelihood of encounter and/or likelihood of injury may be based on one or more vehicle and/or environmental parameters in a vehicle scenario. For example, a vehicle adaptation system may determine that a vehicle is traveling 20 miles per hour in a business district during the lunch hour. Based on the vehicle and/or environmental parameters, the vehicle adaptation system may determine a likelihood of encounter with a pedestrian is above a threshold level, and may retract the adjustable element and maintain the pliable fixed element as primary contact point in a potential encounter with a pedestrian, thereby increasing pedestrian safety. For another example, the vehicle adaptation system may detect another vehicle approaching with a high closure rate. The vehicle adaptation system may determine that, due to the high closure rate, a likelihood of encounter (e.g., impact) is high. Responsive to the determination of a high likelihood of encounter, the vehicle adaptation system may extend the adaptive element to absorb the impact forces from the other vehicle.

In various examples, the adaptive structure may be coupled to an external surface of the vehicle. In some examples, the fixed element may be in the form of a bumper. The bumper may be coupled and/or adjacent to a skin (e.g., outer surface) of the vehicle on a front, rear and/or side portion of the vehicle. In some examples, the bumper may substantially surround the vehicle (e.g., a substantially continuous bumper around the skin of the vehicle).

Additionally or alternatively, the vehicle adaptation system may include an internal adaptive structure. The internal adaptive structure may include an adjustable element configured to modify the rigidity of the vehicle to absorb varying impact forces, such as a shock absorber. In various examples, the adjustable element may be coupled between two inner surfaces of the vehicle (e.g., a frame and an inner surface of the skin, an occupant portion and an outer portion, etc.), and may be configured with adjustable stiffness. In some examples, the adjustable element may include a damper with one or more valves configured to open and close, in whole or in part, to adjust damping forces. Based on the vehicle and/or environmental parameters, the vehicle adaptation system may adjust a position of the one or more valves to adjust the rigidity of the vehicle for the given scenario. For example, based on detection of a pedestrian, the vehicle adaptation system may open the one or more valves to decrease a stiffness of the damper. In some examples, the adjustable element may include an electromagnetic shock absorber (e.g., absorber with magnetorheological fluid). In such examples, the vehicle adaptation system may deliver a varying amount of electrical current to the electromagnetic shock absorber to adjust the stiffness of the electromagnetic shock absorber and, in turn, the rigidity of the vehicle, based on the vehicle and/or environmental parameters. For example, based on detection of a vehicle speed in excess of 35 MPH, the vehicle adaptation system may deliver a maximum amount of electrical current to the electromagnetic shock absorber to increase a stiffness of the shock absorber.

In various examples, the adjustable element may be configured to adjust from a retracted position, in which the adjustable element is coupled to one internal surface of the vehicle, to a deployed position, in which the adjustable element is coupled between two internal surfaces of the vehicle, in order to modify the rigidity of the vehicle and absorb greater impact forces. In some examples, the adjustable element may be extendable, such as via an actuator, a telescoping element, an adjustable spring, or other extension mechanism. In some examples, the adjustable element may be configured to swing from a retracted position to the deployed position, such as via a hinge. In various examples, the adjustable element may be configured to lock into place in the deployed position.

Additionally, in some examples, the internal adaptive structure may include a fixed element. In such examples, the fixed element may be coupled between two inner surfaces of the vehicle (e.g., a frame, an inner surface of the skin, etc.) and may be configured to absorb low impact forces, such as those experienced at slow speeds and/or upon impact with soft objects. For example, a fixed element may be a spring coupled between a front portion and an occupant portion of a vehicle. The spring may be configured to absorb forces up to a maximum force ($F_{max}$). The vehicle adaptation system may determine that the vehicle is likely to encounter forces above $F_{max}$, and may adjust a rigidity of the adjustable element to absorb the greater forces.

The techniques and systems described herein may be implemented in a number of ways. Example implementations are provided below with reference to the following figures.

FIG. 1 illustrates an example environment 100 in which a vehicle 102 with a vehicle adaptation system may operate. The vehicle adaptation system may include an adaptive structure 104 configured to modify the rigidity of a body of the vehicle 102 (e.g., rigidity of the vehicle), to protect occupants and/or pedestrians. In various examples, the body of the vehicle 102 may include an exterior portion and/or an occupant portion in which an occupant may travel. In some examples, the body of the vehicle 102 may include a frame coupled to the exterior portion and/or the occupant portion. In other examples, the body of the vehicle 102 may not include a frame.

For the purpose of illustration, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to stop, including all parking functions, it may be unoccupied. This is merely an example, and the systems and methods described herein may be incorporated into any ground-borne vehicle, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The example vehicle 102 shown in FIG. 1 is an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end of the vehicle 102 is the front end of the vehicle when travelling in a first direction, and such that the first end becomes the rear end of the vehicle 102 when traveling in the opposite, second direction. Similarly, a second end of the vehicle 102 is the front end of the vehicle 102 when travelling in the second direction, and such that the second end becomes the rear end of the vehicle 102 when traveling in the opposite, first direction. These example characteristics may facilitate greater maneuverability, for example, in small spaces or crowded environments, such as parking lots and urban areas.

In the illustrative example, the vehicle 102 includes an adaptive structure 104 coupled to a front surface (e.g., front facia). In some examples, the adaptive structure 104 may be coupled to the front surface, a rear surface, and/or side surfaces of the vehicle 102. For example, the vehicle 102 may include an adaptive structure 104 coupled to the front facia and the rear facia of the vehicle 102. In such an example, the adaptive structures 104 may be configured as front and/or rear bumpers on the vehicle 102. Additionally or alternatively, the vehicle 102 may include an internal adaptive structure coupled between a front and/or a rear portion and an occupant portion of the vehicle 102. In various examples, an internal adaptive structure may be coupled between a side portion and an occupant portion of the vehicle 102.

The adaptive structure 104 may include a fixed element 106 and an adjustable element 108. In some examples, the fixed element 106 may comprise a substantially rigid material, such as a metal material, plastic material, composite material, and/or other substantially stiff or rigid material. In various examples, the fixed element 106 may comprise foam, rubber, plastic, silicone, metal (e.g., aluminum or other relatively "soft" or ductile metal), and/or another pliable material configured to absorb a first range of impact forces. In various examples, the first range of impact forces may include a range of impact forces estimated for a physical encounter with a pedestrian, an animal, and/or other object with a low velocity differential (e.g., 10 MPH). For example, the first range of impact forces may include impact forces associated with a minor collision with another vehicle, such as a fender bender.

The adjustable element 108 may comprise a same or a different material than the fixed element 106. In some examples, the adjustable element 108 may comprise a substantially pliable material. In various examples, the adjustable element 108 may include a substantially rigid material (e.g., metal, plastic, composite, etc.) configured to absorb forces associated with a second range of impact forces, such as those associated with a collision with another vehicle. In such examples, the substantially rigid material may include a rigidity or stiffness that is greater than the material comprising the fixed element. The adjustable element 108 may be configured to extend and retract via one or more actuators (e.g., mechanical actuators, pneumatic actuators, hydraulic actuators, electric actuators, magnetic actuators, pyrotechnic actuator, etc.). In various examples, the one or more actuators may be variable rate actuators. In such examples, the actuators may be configured to extend and/or retract at different rates. In some examples, the actuators may be configured with a first rate for standard actuation, and a second rate for emergency actuation (e.g., rapid extension of the adjustable element for emergency situations).

In various examples, in a retracted position, a front surface of the adjustable element 108 may be substantially flush with a front surface of the fixed element 106. In some examples, in the retracted position, the adjustable element 108 may be recessed into the fixed element 106. In such examples, a front surface of the fixed element 106 may extend outward from a front surface of the adjustable element 108. In various examples, with the adjustable element 108 in the retracted position, the fixed element 106 may be configured to absorb impact forces, such as those associated with a pedestrian impact. In such examples, the pliable material of the fixed element may deform to absorb impact forces, thereby increasing the safety (e.g., decreasing a risk of serious injury to) a pedestrian with whom the vehicle 102 may impact.

In various examples, the vehicle adaptation system may maintain a position of the adjustable element in the retracted position, such as that shown at 110, until one or more conditions are met (e.g., until a parameter threshold is met), such as a vehicle exceeding a predefined velocity. In some examples, the vehicle adaptation system may maintain the position of the adjustable element 108 in an extended position, such as that shown at 112, until one or more conditions are met (e.g., until the parameter falls below the parameter threshold), such as a vehicle reducing below a predefined velocity. In some examples, the parameters may be based on a likelihood of an encounter (e.g., impact) with a pedestrian and/or likelihood of an encounter with another vehicle. In some examples, the parameters may be based on a likelihood of injury to a vehicle occupant and/or a pedestrian in the event of an impact therewith.

The vehicle adaptation system may dynamically adjust a position of the adjustable element 108 based on one or more parameters. The one or more parameters may include vehicle parameters (e.g., velocity, number of occupants, location of occupants, location of the vehicle, etc.) and/or environmental parameters (e.g., detection of pedestrians, a time of day, a day of the week, weather considerations, relative speed of over vehicles, etc.). In various examples, the vehicle adaptation system may receive data from one or more sensors 114 on the vehicle 102. The one or more sensors may include one or more image capture devices (e.g., RGB cameras, intensity cameras, IR cameras, stereo cameras, depth cameras, etc.), motion detectors, wheel encoders, light detection and ranging (LIDAR), radio detection and ranging (RADAR), global positioning system (GPS), microphones, environmental sensors (e.g., ambient temperature gauge, road surface temperature gauge, humidity sensor, and barometric pressure sensor, etc.), and/or other sensors configured to detect the one or more parameters.

The vehicle adaptation system may include a computing system configured to receive and process the data. The computing system may apply the input to an algorithm to determine whether to modify a position of the adjustable element 108. In various examples, the computing system may include a perception system configured to analyze, process, and/or manipulate sensor data to implement an object detection strategy, an object motion strategy (e.g., determining the detected objects that are static and the objects that are in motion), an object classification strategy (e.g., identifying the object type (e.g., car, motorcycle, cyclist, pedestrian, skate boarder, mailbox, building, and street lights)), an object tracking strategy (e.g., tracking an object based on movement of the object in the environment), and a traffic light/sign detection strategy (e.g., identifying traffic lights, stop signs, rail-road crossings, lane markers, and pedestrian cross-walks). In such examples, the determination to modify the position of the adjustable element 108 may be based on one or more of the strategies. In some examples, the computing system may include a localizer system configured to analyze, process, and/or manipulate sensor data to determine a speed, trajectory, and/or location (e.g., one or more of a position or orientation) of the vehicle 102. In such examples, the determination to modify the engagement of the adjustable element 108 may be based on location and movement data.

In various examples, the determination to modify the rigidity of the vehicle (i.e., the position of the adjustable element) may be based on a single parameter. For example, at 110, the vehicle adaptation system may receive input from sensors 114 indicating pedestrians 116 are in proximity to the vehicle. The proximity may be determined based on the pedestrians 116 being within a threshold distance (e.g., pre-defined distance, such as within 20 ft., 10 ft., 5 ft., etc.) of the vehicle 102, such as that determined by the sensor 114 or a second sensor, and/or the vehicle 102 having a constant bearing toward, and decreasing range from the pedestrians 116 (i.e., a high likelihood of impact). Based on the detection of pedestrians 116 in proximity to the vehicle 102, the vehicle adaptation system may maintain the adjustable element 108 in the retracted position or adjust a position of the adjustable element 108 to the retracted position. For another example, the vehicle adaptation system of the vehicle 102, at 110, may determine that a velocity of the vehicle is at or below a threshold velocity, such as a 25 mile-per-hour (MPH) threshold. Based on a detected velocity (e.g., motion sensor input, GPS velocity input, etc.) of the vehicle being at or below the threshold velocity, the vehicle adaptation system may maintain the adjustable element 108 in the retracted position or adjust a position of the adjustable element 108 to the retracted position.

In some examples, the determination to modify the rigidity of the vehicle may be based on two or more parameters. For example, at 110, the vehicle adaptation system may receive input indicating that the vehicle 102 is in an area associated with a speed limit 118(1) of 25 MPH. The vehicle adaptation system may determine that the speed limit 118(1) is at or below a speed limit threshold (e.g., 30 MPH, 25 MPH, 30 kilometers per hour (KPH), etc.), the velocity of the vehicle 102 is at or below a velocity threshold (e.g., 30 MPH, 25 MPH, 30 kilometers per hour (KPH), etc.), and/or that a pedestrian 116 has been detected in proximity to the vehicle. As such, the vehicle adaptation system may maintain the adjustable element 108 in the retracted position or adjust a position of the adjustable element 108 to the retracted position.

In some examples, the vehicle adaptation system may assign a weight to each parameter based on, for example, a probability of injury to an occupant and/or a pedestrian upon impact (e.g., the faster the vehicle travels, the more likely an occupant may be injured in a collision). The weights may include pre-determined values for particular parameters. In some examples, the weights may be determined on a binary basis, such as "1" for the detection of a pedestrian and "0" for the lack of detection. In some examples, the weights may include range-based values, such as "0" for speeds up to an including 10 MPH, "1" for speeds between 11 and 20 MPH, "2" for speeds between 21 and 30 MPH, etc. In various examples, the weights may vary based on one or more factors, such as a condition being established (e.g., pedestrian detected, occupant detected, etc.), a value of a parameter (e.g., speed exceeding 50 MPH), etc. For example, if an occupant is detected, a weight given to the speed of the vehicle may be higher than if an occupant is not detected.

In some examples, the vehicle adaptation system may compare a weight of one or more parameters, or a combination thereof, to a threshold weight. Based on the comparison, the vehicle adaptation system may extend or retract the adjustable element 108. The threshold weight may include a threshold weight for a single parameter and/or a threshold weight for a combination of two or more parameters. For example, a vehicle adaptation system may assign a first weight (10) to an occupant parameter based on a determination that two occupants are in a vehicle, a second weight (15) to a velocity parameter based on a determination that a velocity of the vehicle exceeds 35 MPH, and a third weight 5 to an occupant location based on a determination that the two occupants are seated in a rear portion of the vehicle. The vehicle adaptation system may compare the combined weight (30) to a threshold weight (25) and determine that the combined weight (30) exceeds the threshold weight. Based on the determination of threshold exceedance, the vehicle adaptation system may extend the adjustable element 108 to an extended position. In various examples, the vehicle adaptation system may extend the adjustable element 108 to a particular extended position of a plurality of extended positions based on a level of threshold exceedance, such as a numerical value, a percentage, or the like, which indicates how much the parameter exceeds the threshold. For example, a single parameter weight or a combined weight may exceed a threshold by 10%. Based on the level of exceedance, the vehicle adaptation system may modify the position of the adjustable element to a mid-range extended position. For another example, a single parameter weight or a combined weight may exceed a threshold by 30%. Based on the level of exceedance, the vehicle adaptation system may modify the position of the adjustable element to a fully extended position. In various examples, the vehicle adaptation system may use machine learning to determine whether to modify the rigidity of the vehicle based on the vehicle and/or environmental parameters.

In various examples, the determination to modify the position of the adjustable element 108 may be based on a probability of impact with an object. In such examples, the vehicle adaptation system may process, analyze, and/or manipulate data from the sensors to determine the probability of impact with a detected object. In some examples, the probability of impact may be based on a vehicle speed, an object speed, a vehicle track, an object track, an ability to avoid impact (e.g., swerve and/or brake to avoid impact), or other factors that may increase and/or decrease a probability of impact.

At 112, the vehicle adaptation system may determine that one or more parameters is different from the parameters at 110, and may dynamically adjust the position of the adjustable element 108 to an extended position. As discussed above, the determination to adjust the position of the adjustable element 108 may be based on a single parameter, such as the speed limit 118(2) being above a threshold speed limit, or on multiple parameters, such as the speed limit 118(2) being above the threshold speed limit, the velocity of the vehicle 102 being above a threshold velocity, and/or the sensor 114 not detecting a pedestrian 116.

In the extended position, the front surface of the adjustable element 108 may extend a distance (e.g., 50 mm, 100 mm, 200 mm, 6 inches, 10 inches, etc.) beyond the front surface of the fixed element 106. In various examples, the adjustable element 108 may include one or more sensors configured to detect an impact with an object. In such examples, the vehicle adaptation system may receive input from the one or more sensors, and send a signal to a vehicle safety system to enhance vehicle safety. For example, the vehicle adaptation system may send a signal to an airbag activation system to deploy an airbag to further enhance the safety of vehicle occupants.

In various examples, the adjustable element 108 may be configured to extend to one or more discrete extended positions, each extended position corresponding to a distance beyond the front surface of the fixed element 106. In such examples, the one or more extended positions may be based on one or more vehicle and/or environmental parameters. For example, the vehicle adaptation system may extend the adjustable element 108 to a first extended position based on an indication of velocity being in a first velocity range (e.g., 30-39 MPH). Responsive to the vehicle accelerating beyond the first velocity range and into a second velocity range (e.g., 40-55 MPH), the vehicle adaptation system may extend the adjustable element 108 to a second extended position, the second extended position being greater than the first extended position. In such an example, the adjustable element 108 at the second extended position may absorb greater impact forces corresponding to higher velocities.

In various examples, the adjustable element 108 may be configured to have a variable stiffness to absorb impact forces at different rates. The variable stiffness may be effected by one or more materials of the adjustable element 108 and/or activation of the actuator to assist in force absorption. In some examples, the vehicle adaptation system may determine the stiffness of the adjustable element 108 based on a size, age and/or weight of a vehicle occupant. In such examples, the vehicle adaptation system may generate a softer crash pulse (i.e., impact/loading speed) for more fragile vehicle occupants.

As discussed above, in various examples, the vehicle adaptation system may include an adaptive structure 104 on a front, rear, and/or side surface of the vehicle 102. In such examples the vehicle adaptation system may modify a position of an adjustable element 108 of a first adaptive structure independent of a position of an adjustable element 108 of a second adaptive structure. For example, a vehicle 102 may have a front adaptive structure and a rear adaptive structure, each with an adjustable element 108 extended in a mid-range extended position (e.g., extended 100 mm out of a possible range of 200 mm). The vehicle adaptation system may receive input from a sensor that two occupants are located in a front portion of the vehicle 102 (i.e., relatively proximate to the front facia). Based in part on the input, the vehicle adaptation system may modify a position of the front adjustable element 108 to a maximum extended position, while maintaining the mid-range extended position of the rear adjustable element 108, in order to maximize the magnitude of impact forces absorbed by the adjustable element 108 upon impact with an object (e.g., another vehicle, an animal, a fixed structure, etc.).

In various examples, the vehicle adaptation system may dynamically modify a position of an adjustable element based on a prediction and/or an indication of imminent impact. In such examples, one or more sensors of the vehicle adaptation system may identify an object with a closure rate (i.e., closing speed or the speed of approach of an object) indicative of an imminent impact, which may be based on a distance between the vehicle and the object, a difference in speed between the vehicle and object, such as a 10 MPH difference, 20 MPH difference, etc., and/or a stopping distance. Based on the identification of the object (e.g., one or more of a segmentation or a classification), the vehicle adaptation system may predict that the impact will occur, and may extend the adjustable element 108. In various examples, the extension of the adjustable element 108 may be to one of many extended positions up to and including and a maximum extended position (e.g., 100 mm extension, 200 mm extension, 250 mm extension). In some examples, the vehicle adaptation system may include pyrotechnic actuators configured to extend the adjustable element 108 to the maximum extended position in the event of a detected imminent impact (e.g., closure rate above a threshold). For example, a vehicle 102 may be stopped at a stop light. The vehicle adaptation system may maintain an adjustable element on the front facia and an adjustable element on the rear facia in the retracted position. A sensor on the vehicle 102, such as a LIDAR sensor, may determine that an approaching vehicle has a high closure rate, and that a rear impact is imminent. Based on the determination that a rear impact is imminent, the vehicle adaptation system may modify a position of the adjustable element 108 to a maximum extended position. Additionally, the vehicle adaptation system may modify a position of the adjustable element 108 on the front facia, such as based on a determination that another vehicle is stopped at the light in front of the vehicle 102, and that an impact with the vehicle in front could occur due to the force of impact from the rear vehicle.

Figure 2:
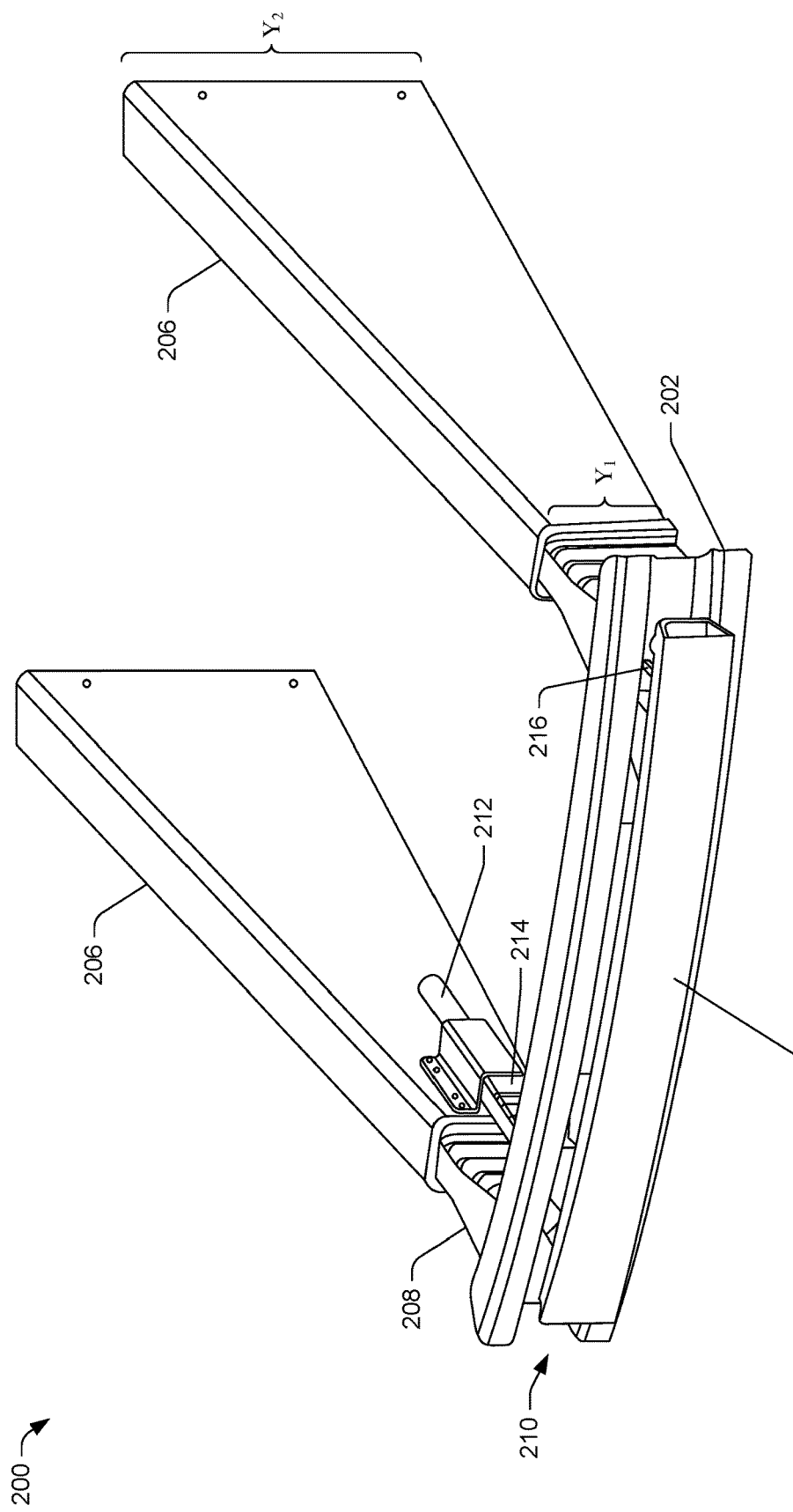
FIG. 2 is a perspective view of an example external adaptive structure of a vehicle adaptation system.

FIG. 2 illustrates an example external adaptive structure 200 of a vehicle adaptation system, such as adaptive structure 104. The external adaptive structure 200 may include a fixed element 202, such as fixed element 106, and an adjustable element 204, such as adjustable element 108. The external adaptive structure 200 may be configured as a bumper, and coupled to a front, rear, and/or side portion of a vehicle, such as vehicle 102, so that a back side (e.g., vehicle-facing) surface of the fixed element 106 may be substantially flush with a surface of the vehicle.

The fixed element 202 may be configured to be coupled to an internal structure of the vehicle via one or more rails 206. In the illustrative example, the fixed element 202 is coupled to each rail 206 via a crush can 208 configured to absorb forces imposed on the external adaptive structure 200 regardless of a position of the adjustable element 204. The crush can 208 may include a metal material, a plastic material, rubber material, a composite material, or other material capable of absorbing impact forces. In various examples, the crush can 208 may include a spring (e.g., helical spring, leaf spring, flat spring, etc.) coupled between the fixed element 202 and the rail 206. In various examples, the crush can 208 may be configured to have a variable stiffness for different stages of a crash event. In such examples, the crush can 208 may be configured to absorb additional impact forces (e.g., may be more rigid) at different stages of a crash event. For example, the crush can 208 may comprise a first stiffness in a first section and a second, higher, stiffness in a second section. In some examples, the variable stiffness may be effected by different materials of the crush can 208 and/or an actuator.

In some examples, the fixed element 202 may be coupled directly to the rails 206. As illustrated in FIG. 2, the rails 208 may be configured with a first end (proximal to the surface of the vehicle) of a height $Y_1$, and a second end (distal to the surface of the vehicle) of a height $Y_2$. In this configuration, the cross-sectional area of the second end is larger than that of the first end, providing an increased distribution of impact force at the second end. In some examples, the heights $Y_1$ and $Y_2$ of the rails 206 may be substantially equivalent in value.

The fixed element 202 may include a substantially pliable material, such as foam, rubber, plastic, silicone, or another flexible material configured to absorb impact forces and increase pedestrian safety. The fixed element 202 may be configured to deform based on a force being applied thereto, and to substantially return to an original form. The fixed element 202 may include a cutout 210 configured to house the adjustable element 204. In some examples, the cutout 210 may be configured so that a front surface of the fixed element 202 and a front surface of the adjustable element 204 are substantially flush when the adjustable element 204 is in a retracted position. In such examples, the fixed element 202 and the adjustable element 204 may act as one bumper to absorb forces of impact. In some examples, the cutout 210 may be configured so that the front surface of the fixed element 202 extends a distance (e.g., 10 mm, 1 inch, etc.) beyond the front surface of the adjustable element 204 in the retracted position. In such examples, the distance may permit the fixed element 202 to absorb impact forces from an object without the object having substantial contact with the adjustable element 204. For example, a vehicle may have an encounter with a pedestrian, and the pliable surface of the fixed element 202 may absorb the impact forces, without the pedestrian contacting the adjustable element 204.

As discussed above, the vehicle adaptation system may be configured to modify a position of the adjustable element 204 based on one or more parameters. The one or more parameters may include vehicle parameters (e.g., velocity, number of occupants, location of occupants, location of the vehicle, etc.) and/or environmental parameters (e.g., detection of pedestrians, a zone and/or area the vehicle is in, a time of day, a day of the week, weather considerations, relative speed of over vehicles, etc.). In various examples, the vehicle adaptation system may receive input from one or more sensors on the vehicle 102 to determine a status of the one or more parameters (e.g., determine whether a parameter is met). For example, the vehicle adaptation system may include a range of velocities associated with one or more positions of the adjustable element 204. A first range of 0-20 MPH may be associated with a retracted position, a second range of 21-35 MPH may be associated with a first extended position (e.g., 25 mm, 50 mm, 100 mm, etc.), and a third range of 36-65 MPH may be associated with a second extended position (e.g., 200 mm, 250 mm, 300 mm, etc.). Based on data from a motion sensor that the vehicle has accelerated from 15 MPH to 30 MPH, the vehicle adaptation system may modify the position of the adjustable element 204 to the first extended position.

The vehicle adaptation system may modify the position of the adjustable element 204 via one or more actuators 212. The one or more actuators 212 may be mechanical (e.g., scissor-drive actuator, screw-drive actuator, etc.), pneumatic, hydraulic, electric, electro-mechanical, magnetic, pyrotechnic, and/or other types of actuators. In various examples, the one or more actuators 212 may be configured to modify a position of the adjustable element 204 at an adjustable rate. For example, for normal operations, the actuator 212 may be configured to deploy the adjustable element 204 to a maximum extended position in 90 milliseconds, and in 50 milliseconds in an emergency situation. In such an example, the vehicle adaptation system may identify the emergency situation based on input from the one or more sensors, such as input indicating that an impact is imminent (e.g., closure rate of approaching vehicle exceeds a threshold closure rate). As shown in FIG. 2, the actuators 212 may each be coupled to the rail 206. In some examples, the actuator 212 may be coupled directly to an internal frame of the vehicle.

In various examples, the vehicle adaptation system may include one type of actuator 212 coupled to each rail 206 and/or the internal frame, such as pneumatic actuator. In some examples, the vehicle adaptation system may include two types of actuators 212 coupled to each rail 206 and/or the internal frame. In such examples, the vehicle adaptation system may include a first type of actuator 212, such as a pneumatic actuator, configured to extend and retract the adjustable element 204 to various positions a plurality of times, and a second type of actuator, such as a pyrotechnic actuator, configured to rapidly extend the adjustable element 204 to a maximum position. In such examples, the pyrotechnic actuator may be actuated based on a determination of imminent impact with another object and/or other emergency situation. For example, a vehicle traveling in a school zone may have a front and rear adjustable element in the retracted position. The vehicle adaptation system may receive an indication from a sensor that another vehicle has a fast closure rate. The vehicle adaptation system may determine that an impact with the other vehicle is imminent and may send a signal to the pyrotechnic actuator to deploy the adjustable element 204 to absorb the impact forces and protect vehicle occupants.

In various examples, the one or more actuators 212 may be coupled to the adjustable element 204 via one or more arms 214. The one or more arms 214 may comprise a metal material, a plastic material, a composite material, other substantially rigid material, and/or a combination thereof. In some examples, the vehicle adaptation system may include a guidance tube 216. The guidance tube 216 may be configured to assist in guiding to the adjustable element 204 as it is extended and retracted. Additionally, the guidance tube 216 may prevent the adjustable element 204 from shifting laterally upon impact.

The adjustable element 204 may comprise a metal material, a plastic material, a composite material, other substantially rigid material, and/or a combination thereof. The adjustable element 204 may include a rigidity or stiffness that is greater than the fixed element 202. In some examples, the adjustable element 204 and the one or more arms 214 may comprise a same or different materials. The adjustable element 204 may be configured to be a first point of contact with an object that could cause injury to occupants of the vehicle upon impact, such as another vehicle. As the first point of contact, the adjustable element 204 may absorb initial impact forces, and transfer the impact forces to the actuators 212 and the rails 206 via the one or more arms 212.

Figure 3A:
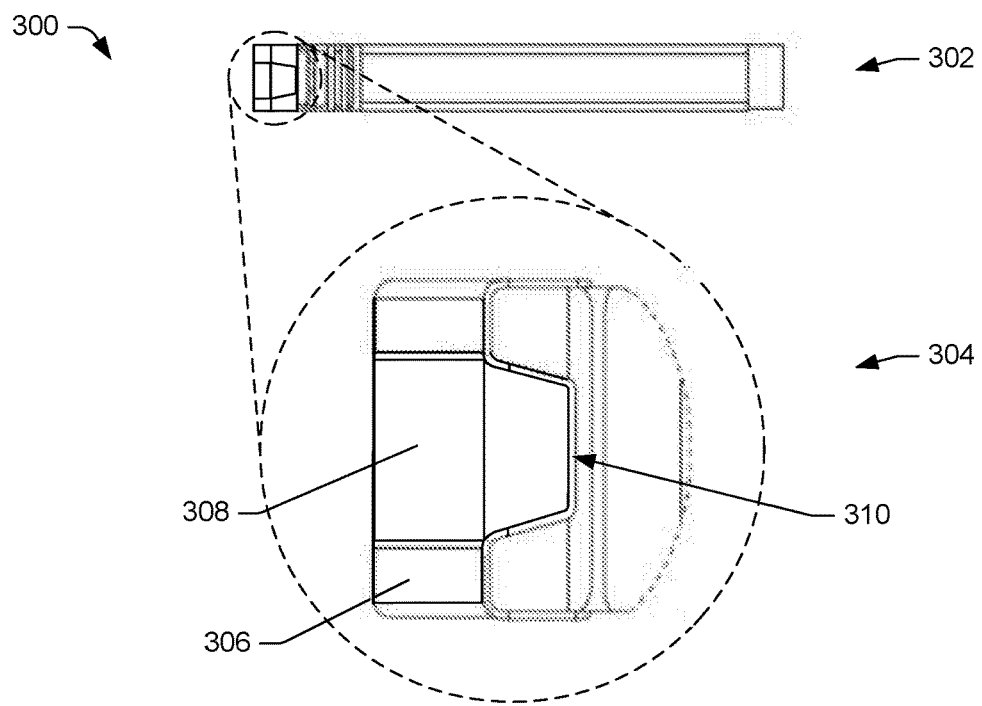
FIG. 3A is a side view and a perspective view of an example external adaptive structure in a retracted position.

FIG. 3A illustrates a side view 302 and a perspective view 304 of an example external adaptive structure 300, such as external adaptive structure 200, in a retracted position. In various examples, the vehicle adaptation system may maintain the retracted position based on an increased likelihood of encounter with a pedestrian and/or other living object. The likelihood of encounter with pedestrians may be based on vehicle parameters (e.g., speed, etc.) and/or environmental parameters (e.g., detection of a pedestrian in proximity to the vehicle, school zone, time of day).

The external adaptive structure 300 may include a fixed element 306, such as fixed element 202, and an adjustable element 308, such as adjustable element 204. The fixed element 306 and the adjustable element 308 may comprise the same material or different materials. In various examples, the fixed element 306 may include a rigidity or stiffness that is greater than the rigidity or stiffness of the adjustable element 308. In some examples, the adjustable element may include a rigidity or stiffness that is greater than the rigidity or stiffness of the fixed element 306. In some examples, the fixed element may comprise a substantially pliable material, such as foam, rubber, plastic, silicone, etc., to absorb a first range of impact forces, and the adjustable element may comprise a substantially rigid material (e.g., metal, plastic, composite, etc.). In such examples, the substantially rigid material may include a rigidity or stiffness that is greater than the substantially pliable material.

The fixed element 306 may include a cutout 310, such as cutout 210 configured to house the adjustable element 308 in the retracted position. As shown in FIG. 3A, in the retracted position, a front surface of the adjustable element 308 may be substantially flush with the front surface of the fixed element 306. In various examples, in the retracted position, the adjustable element 308 may be recessed into the fixed element 306 such that the front surface of the fixed element 306 is a distance outward from the front surface adjustable element 308. In other examples, in the retracted position, the front surface of the adjustable element 308 may extend slightly (e.g., 1 mm, 3 mm, etc.) from a front surface of the fixed element 306.

Figure 3B:
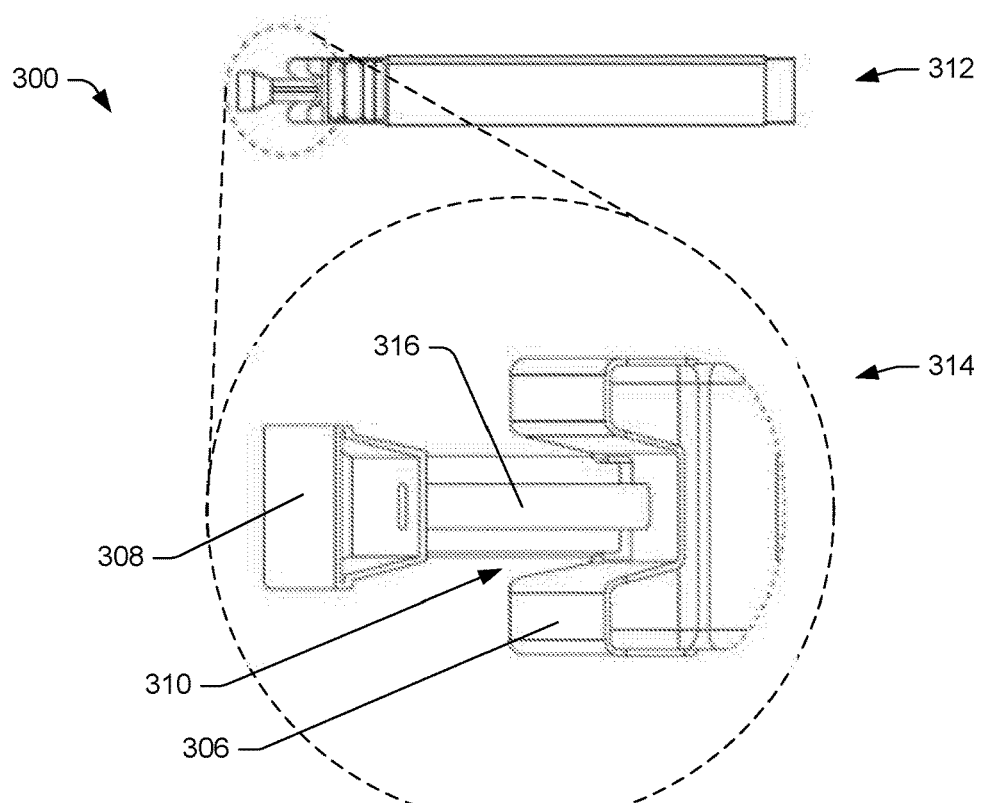
FIG. 3B is a side view and a perspective view of the example external adaptive structure of FIG. 3A in an extended position.

FIG. 3B illustrates a side view 312 and a perspective view 314 of the example external adaptive structure of FIG. 3A in an extended position. In various examples, the vehicle adaptation system may deploy the adjustable element 308 to an extended position based on an increased likelihood of encounter with other vehicles and/or inanimate objects and/or decreased likelihood of encounter with pedestrians. The likelihood of encounter with other vehicles and/or inanimate objects may be based on vehicle parameters (e.g., speed, etc.) and/or environmental parameters (e.g., school zone, time of day, etc.).

The adjustable element may comprise a substantially rigid material. In the extended position, may be a first point of contact with another object upon impact. The adjustable element may be extended via an actuator, such as actuator 212. In various examples, the actuator may be configured to extend the adjustable element 308 to a single extended position. In some examples, the actuator may be configured to extend the adjustable element 308 to one or more discrete extended positions. For example, the actuator may be configured to extend the adjustable element 308 to a maximum extended position and a mid-range extended position, halfway between the maximum extended and retracted positions.

In various examples, the actuator may be configured to receive a signal from a computing system of the vehicle adaptation system to modify a position of the adjustable element 308. Based on the signal, the actuator may deploy the adjustable element 308. In various examples, the actuator may deploy the adjustable element 308 at a fixed rate. In such examples, the adjustable element 308 may move to a designated extended position in a certain amount of time (e.g., 60 milliseconds for maximum extension). In some examples, the actuator may deploy the adjustable element 308 at a variable rate, based on whether one or more conditions are met (e.g., one or more parameter thresholds are met). For example, a vehicle adaptation system on a non-moving vehicle may receive input indicating an object is approaching the vehicle with a high closure rate, such that impact is imminent. Based on the input, the vehicle adaptation system may send a signal to the relevant actuators to emergency deploy (e.g., at a faster rate than a normal deployment) the adjustable element 308 to a maximum extended position.

As illustrated at 314, the adjustable element may be coupled to the actuator via an arm 316. The arm 316 and the adjustable element 308 may comprise a same and/or different materials. In some examples, the arm 316 and the adjustable element 308 may together comprise a single element. The arm 316 may be configured to travel through an opening in the fixed element 306 during deployment and retraction of the adjustable element 308. The opening may comprise a bushing, a lining, bearing, and/or other type of surface to facilitate unimpeded movement of the arm 316 through the opening.

Figure 4:
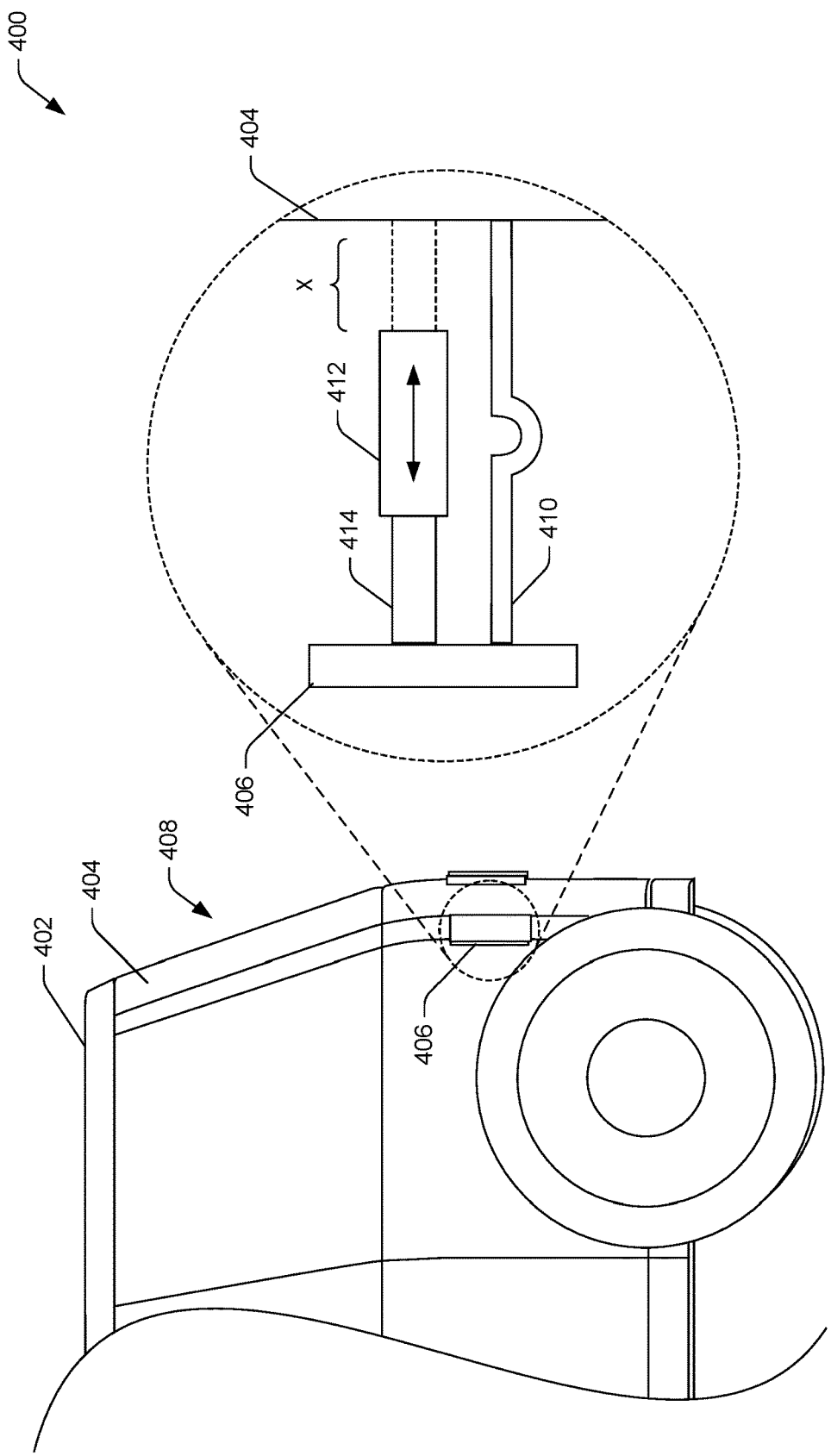
FIG. 4 is a side view of an example internal adaptive structure of a vehicle adaptation system.

FIG. 4 illustrates an enlarged view of an example internal adaptive structure 400 of a vehicle adaptation system. The internal adaptive structure 400 may be mounted internal to a vehicle 402, such as vehicle 102, between an external portion 404 and an internal portion 406. In various examples, the external portion 404 may include an internal surface, to which the internal adaptive structure 400 is mounted, and an external surface 408, such as a front, rear, or side surface of the vehicle 402. In some examples, the internal portion 406 of the vehicle 402 may comprise an occupant portion.

The internal adaptive structure 400 may comprise a fixed element 410 and an adjustable element 412. The fixed element 410, similar to fixed element 106, may comprise a substantially pliable material. The fixed element 410 may comprise foam, rubber, plastic, silicone, metal (e.g., aluminum or other relatively "soft" or ductile metal), and/or another pliable material configured to absorb a first range of impact forces. In various examples, the fixed element 410 may be configured as a spring (e.g., helical spring, leaf spring, flat spring, etc.), with a spring constant (e.g., force deflection characteristic) configured to absorb the first range of impact forces (e.g., $1 \times 10^3 \text{N}$-$2 \times 10^5 \text{N}$). In various examples, the first range of impact forces may include a range of forces estimated for a physical encounter with a pedestrian, an animal, and/or other object with a low velocity differential (e.g., 10 MPH). For example, the fixed element 410 may be configured to absorb forces associated with minor impacts with other vehicles, such as in a fender bender. In the illustrative example, the vehicle 402 may have an external surface 408 with a cross section configured to distribute impact forces over a greater area than a typical bumper. The external surface 406 may be coupled, via the external portion 404, to the fixed element 410. Based on an impact of the vehicle 402 with the pedestrian, the impact forces may be distributed across the external surface 406, and may be absorbed by the fixed element 410 of the vehicle adaptation system. The absorption of the impact forces by the fixed element 410 may decrease injuries suffered by the pedestrian.

Adjustable element 412, similar to adjustable element 108, may comprise a substantially rigid material (e.g., metal, plastic, composite, etc.), as compared to the fixed element 410. In various examples, the adjustable element 412 may be configured to extend and retract via one or more actuators 414 (e.g., mechanical actuators, pneumatic actuators, hydraulic actuators, electric actuators, magnetic actuators, pyrotechnic actuator, etc.). In a retracted position, such as that shown in FIG. 4, the adjustable element 412 may be decoupled from the external portion 404. The adjustable element 412 may be configured so that a proximal surface to the external portion 404 is a distance X from the external portion 404. The distance X may provide sufficient distance for the external portion 404 to move horizontally as the fixed element 410 absorbs the first range of impact forces. In various examples, in the retracted position, the adjustable element 412 may absorb impact forces that exceed the first range of impact forces, such as a force large enough to cause the fixed element 410 to fail and drive the external portion 404 the distance X or greater toward the internal portion 406. In such examples, the adjustable element 412 may absorb a substantial amount of the impact forces that exceed the first range of impact forces, thereby providing an additional safety benefit, such as in an emergency situation.

The vehicle adaptation system may be configured to dynamically adjust a position of the adjustable element 412 from the retracted position to the extended position based on one or more parameters. The one or more parameters may include vehicle parameters (e.g., velocity, number of occupants, location of occupants, location of the vehicle 402, etc.) and/or environmental parameters (e.g., detection of pedestrians, a time of day, a day of the week, GPS location, weather considerations, relative speed of over vehicles, etc.). In various examples, the vehicle adaptation system may receive input from one or more sensors, such as sensors 114 on the vehicle 102. The one or more sensors may include cameras, motion detectors, wheel encoders, IMU, gyroscopes, accelerometers, magnetometers, LIDAR, RADAR, GPS, microphones, environmental sensors (e.g., ambient temperature gauge, road surface temperature gauge, humidity sensor, and barometric pressure sensor, etc.), and/or other sensors configured to detect the one or more parameters.

A computing system of the vehicle adaptation system may be configured to receive and process the input. The computing system may apply the input to an algorithm to determine whether to modify the position of the adjustable element 412. In various examples, a determination to modify the position of the adjustable element may be based on a single parameter. In some examples, the determination to modify the position of the adjustable element may be based on multiple parameters. In such examples, each parameter may be weighted based on a probability of encounter and/or probability of injury. For example, a vehicle speed may be weighted higher with speeds in excess of 40 MPH, as a probability of injury to occupants may increase above that speed. For another example, a detection of a pedestrian within 10 feet of the vehicle 402 may be weighted higher than a vehicle detected over 10 feet from the vehicle 402, as the probability of encounter and thus injury to the pedestrian may be elevated the closer the pedestrian is to the vehicle 402.

In various examples, the determination may be based on a condition being met. For example, a determination to retract the adjustable element 412 may be based on a detection of a pedestrian and/or other living object in proximity to the vehicle 402. In such an example, if an encounter with a pedestrian were to occur, the large surface area of the external surface 406 may distribute impact forces, and the external portion 404 may move inward as the fixed element 410 absorbs the impact forces. For another example, a determination to extend the adjustable element 412 may be based on a determination that a closure rate of another vehicle exceeds a threshold closure rate, and that an impact therewith is imminent.

In various examples, the one or more actuators 414 may extend the adjustable element 412 at a fixed rate. In some examples, the one or more actuators 414 may extend the adjustable element 412 at an adjustable rate. In such examples, the computing system may determine that an expedited deployment of the adjustable element 412 may be necessary, such as based on the determination that an impact is imminent.

In an extended position, the adjustable element 412 may be coupled to the external portion 404 and configured to absorb a second range of impact forces (e.g., $2.1 \times 10^5 \text{N} - 2 \times 10^7 \text{N}$), such as those associated with a collision with another vehicle or other object that could threaten the safety of the vehicle occupants. The adjustable element 412 may be configured to collapse to absorb energy. Based on an impact force being transferred via the external portion 404, the adjustable element 412 may absorb the impact force by structurally failing (e.g., collapsing). The structural failure and/or collapse of the adjustable element 412 may substantially prevent impact forces from being transmitted to the internal portion 406, thereby protecting occupants.

Figure 5:
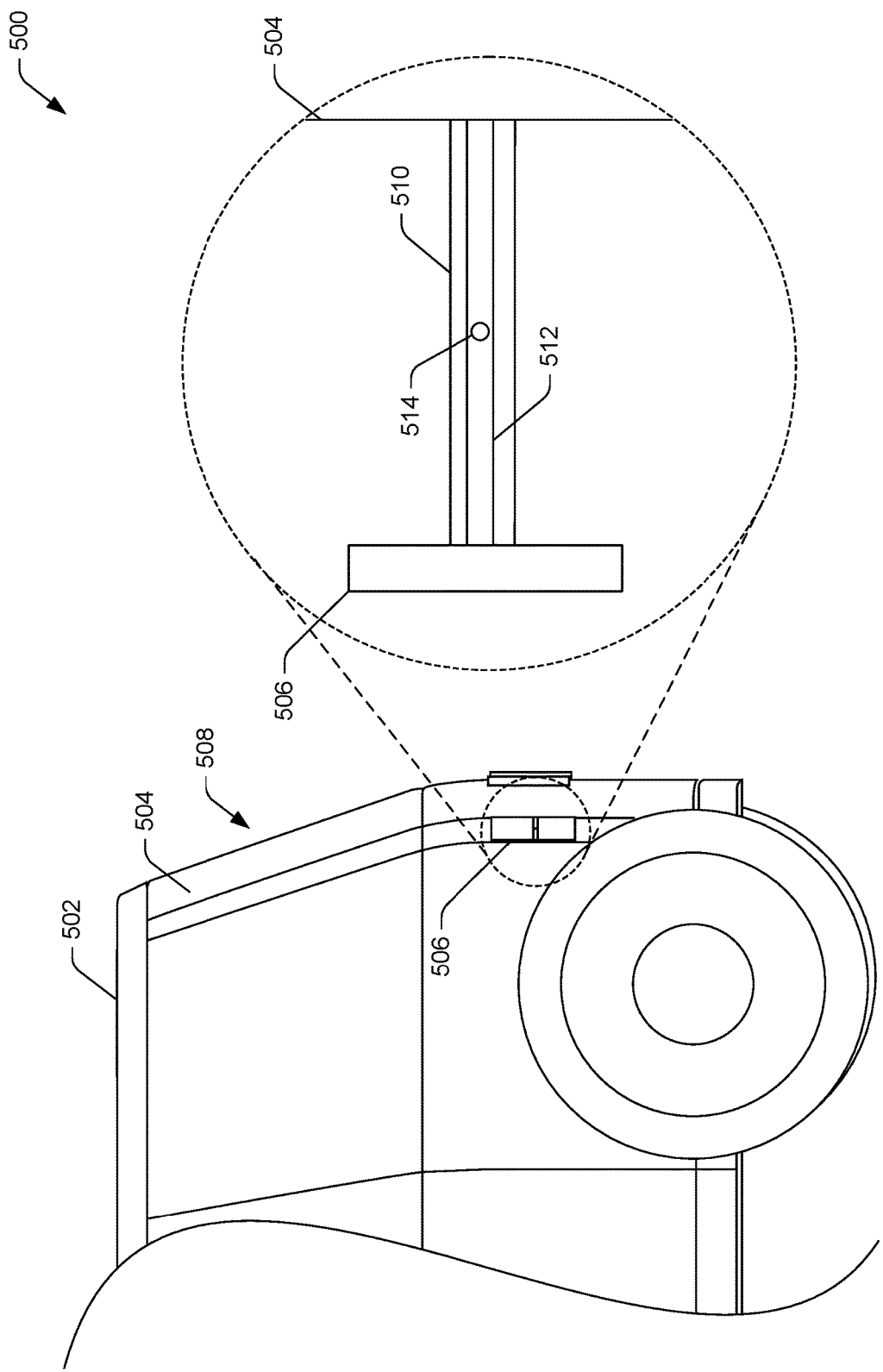
FIG. 5 is a side view of an example internal adaptive structure of a vehicle adaptation system.

FIG. 5 illustrates an enlarged view of an example internal adaptive structure 500 of a vehicle adaptation system. The internal adaptive structure 500 may be mounted internal to a vehicle 502, such as vehicle 102, coupled between an external portion 504 and an internal portion 506. In various examples, the external portion 404 may include an internal surface, to which the internal adaptive structure 500 is mounted, and an external surface 508, such as a front, rear, or side surface of the vehicle 502. In some examples, the internal portion 506 of the vehicle 502 may comprise an occupant portion.

In the illustrative example, the internal adaptive structure 500 comprises an adjustable element 510 configured with adjustable stiffness. The vehicle adaptation system may adjust the stiffness of the adjustable element 510 to modify the rigidity of the vehicle body to absorb varying impact forces. For example, in a scenario in which an encounter with a pedestrian is likely, the vehicle adaptation system may decrease the stiffness of the adjustable element 510 to absorb impact forces associated with a pedestrian encounter. For another example, in a scenario in which an injury to an occupant of the vehicle 502 would be likely to occur upon impact with another vehicle, the vehicle adaptation system may increase the stiffness of the adjustable element 510 to absorb a large amount of impact forces, thereby protecting the occupant.

As illustrated in FIG. 5, the adjustable element 510 may include a damper 512 with one or more valves 514 configured to open and close, in whole or in part, to adjust the stiffness. Based on the vehicle and/or environmental parameters, the vehicle adaptation system may adjust a position of the one or more valves 514 to adjust the rigidity of the vehicle body for the given scenario. For example, based on detection of a pedestrian, the vehicle adaptation system may open the one or more valves 514 to decrease a stiffness of the damper 512.

In other examples, the adjustable element 510 may include an electromagnetic shock absorber (e.g., absorber with magnetorheological fluid). In such examples, the vehicle adaptation system may deliver a varying amount of electrical current to the electromagnetic shock absorber to adjust the rigidity of the vehicle body, based on the vehicle and/or environmental parameters. For example, based on detection of a vehicle speed in excess of 45 MPH, the vehicle adaptation system may deliver a maximum amount of electrical current to the electromagnetic shock absorber to increase a stiffness of the adjustable element 510.

Figure 6:
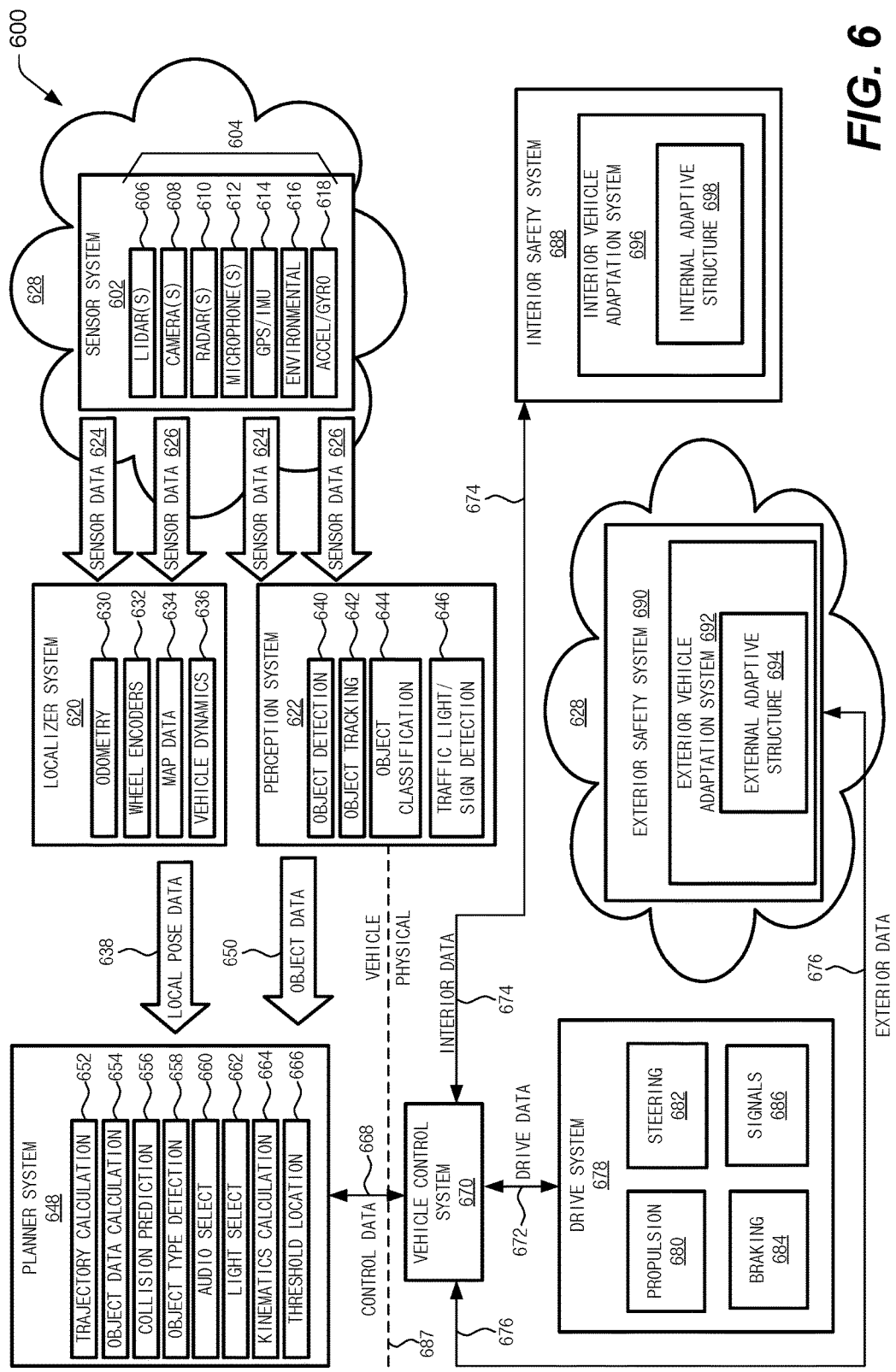
FIG. 6 is a block diagram showing example components of an operational control system of a vehicle configured with a vehicle adaptation system.

FIG. 6 illustrates example components of an operation control system 600 configured to control operations of a vehicle with a vehicle adaptation system. In various examples, the operation control system 600 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, Performance Optimization With Enhanced RISC—Performance Computing (PowerPC), Scalable Processor Architecture (SPARC), or Microprocessor without Interlocked Pipeline Stages (MIPS) instruction set architecture (ISA)s, or any other suitable ISA. In multiprocessor systems, each processor may commonly, but not necessarily, implement the same ISA.

The operation control system 600 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic random access memory (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent or stored on different types of computer-accessible media, such as non-transitory media, or on similar media separate from the non-transitory computer readable media. Generally speaking, a non-transitory, computer readable memory may include storage media or memory media, such as flash memory (e.g., solid-state memory), magnetic or optical media (e.g., a disk) coupled to the operation control system 600 via an input/output (I/O) interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In one implementation, the I/O interface may be configured to coordinate I/O traffic between the processor(s), the non-transitory computer readable media, and any peripheral devices, the network interface or other peripheral interfaces, such as input/output devices. In some implementations, the I/O interface may perform any necessary protocol, timing or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example shown in FIG. 6, the operation control system 600 includes a sensor system 602 including a plurality of sensors 604. The sensors 604 may include, for example, LIDAR 606, image capture sensors 608 (e.g., cameras or other imagers), RADAR 610, sound capture sensors 612 (e.g., microphones), global positioning system (GPS) sensors and/or inertial measurement unit sensors (IMU) 614. The sensor system 602 may also include one or more environmental sensors 616, such as, for example, one or more sensors for detecting ambient temperature, magnetic field, temperature of the road surface, humidity, and barometric pressure. The sensor system 602 may also include an accelerometer/gyroscope 618 to measure the orientation and/or acceleration of the vehicle, such as vehicle 102.

The operation control system 600 may also include a localizer system 620 and a perception system 622 that may receive location and environment sensor data 624 and/or object sensor data 626, respectively, from one or more of the sensors 604 of the sensor system 602. For example, the localizer system 620 may receive location and environment sensor data 624 associated with the location of the vehicle in the environment 628, such as from GPS/IMU 618, image capture sensors 608, and/or LIDAR(s) 606. The perception system 622 may receive object sensor data 626 relevant to determining information associated with objects in the environment 628 surrounding the vehicle, such as sensor data from LIDAR 606, image capture sensors 608, RADAR 618, environmental sensors 616, and/or sound capture sensors 612. In some examples, the localizer system 620 may receive data from sources other than the sensor system 602, such as, for example, map data, map tile data, route data, route network definition file (RNDF) data, a data store, and/or a data repository. In some examples, the location and environment sensor data 624 received by the localizer system 620 may be identical (or at least similar to) to the object sensor data 626 received by the perception system 622. In some examples, the sensor data 624, 626 received by the localizer system 620 may not be identical to the sensor data 624, 626 received by the perception system 622. The sensor data 624, 626 may each include data from any combination of one or more sensors or sensor types in the sensor system 602. The amounts and types of sensor data 624, 626 may be independent from one another and/or may be similar or equivalent.

The localizer system 620 may receive and/or access data from sources other than sensor data 624, 626, such as, for example, odometer data 630 from motion sensors configured to estimate a change in position of the vehicle over time, wheel encoders 632 configured to calculate motion, distance, and other metrics associated with the vehicle based on the rotations of one or more of the wheels, map data 634 from data representing map tiles, route data, RNDF data, and/or other data, and data representing the model and/or type of vehicle corresponding to the vehicle, which may be used to calculate vehicle location data based on vehicle dynamics modeling 636 (e.g., from simulations, captured data, etc.) of the vehicle. The localizer system 620 may use one or more of the data resources indicated herein to generate data representing local position and orientation data (e.g., local pose data 638).

In some examples, the perception system 622 may analyze, process, and/or manipulate sensor data 624, 626 to implement object detection 640 and/or an object tracking 642. In various examples, the processing may include image processing to detect (e.g., recognize, identify, etc.) objects in an image. In such examples, the detection may be based on a size and/or shape of an object, a location of an object (e.g., on a road, on a sidewalk, etc.), a speed and/or motion of the object, or the like. This can include differentiating between objects that are static and objects that are in motion. The object tracking 642 may also track one or more moving objects based on the movement of the object in the environment 628. This may also include an object classification 644 to identify the object type—e.g., car, motorcycle, cyclist, pedestrian, empty box, trash, etc. In various examples, the object classification 644 may include image processing to classify the object type. The perception system 622 may also include a traffic light/sign detection 646 strategy (e.g., identifying traffic lights, stop signs, railroad crossings, lane markers, and pedestrian crosswalks).

In the example shown, the operation control system 600 also includes a planner system 648 configured to receive the local pose data 638 and object data 650, and analyze the local pose data 638 and the object data 650 to implement functions including, for example, a trajectory calculation 652, an object data calculation 654, a collision prediction 656, an object type detection 658, an audio signal selection 660, a light pattern selection 662, a kinematics calculation 664, and a threshold location estimation 666. The example planner system 648 may communicate trajectory and control data 668 to a vehicle control system 670. The vehicle control system 670 may be configured to process the control data 668 to generate drive system data 672, interior safety system data 674, and exterior safety system data 676. The drive system data 672 may be communicated to a drive system 678, and the drive system 678 may be configured to communicate the drive system data 672 to a propulsion system 680, a steering system 682, a braking system 684, and a signal system 686 (e.g., turn signals, brake signals, headlights, and/or running lights). For example, the drive system 672 may include propulsion data (e.g., a voltage, current, or power signal for electric motors, and/or a throttle signal for internal combustion engines) for the propulsion system 680, steering angle data for the steering system 682 (e.g., a steering angle setting), and braking data for the braking system 684 (e.g., a deceleration rate to be achieved).

In the example shown in FIG. 6, a dashed line 687 may represent a demarcation between a vehicle trajectory processing layer and a vehicle physical execution layer, where data processed in the vehicle trajectory processing layer is implemented by one or more of the drive system 678, an interior safety system 688, and/or an exterior safety system 690. For example, one or more portions of the interior safety system 688 may be configured to enhance the safety of occupants of the vehicle in the event of a collision and/or other event, such as an abrupt collision avoidance maneuver by the vehicle. In some examples, one or more portions of the exterior safety system 690 may be configured to reduce impact force or other adverse effects of a collision.

In various examples, the exterior safety system 690 may include systems, such as, for example, an exterior vehicle adaptation system 692 including an external adaptive structure 694. The external adaptive structure 694 may include a fixed element, such as fixed element 106, and an adjustable element, such as adjustable element 108. In various examples, the external adaptive structure 694 may be configured as a bumper, and coupled to a front, rear, and/or side portion of a vehicle, such as vehicle 102.

In some examples, the fixed element may include a substantially pliable material, and may be configured to absorb impact forces and increase pedestrian safety. The fixed element may be configured to deform based on a force being applied thereto, and to substantially return to an original form. The fixed element may include a cutout configured to house the adjustable element. In some examples, the cutout may be configured so that a front surface of the fixed element and a front surface of the adjustable element are substantially flush when the adjustable element is in a retracted position. In such examples, the fixed element and the adjustable element may act as one bumper to absorb forces of impact. In some examples, the cutout may be configured so that the front surface of the fixed element extends a distance (e.g., 10 mm, 1 inch, etc.) beyond the front surface of the adjustable element in the retracted position. In such examples, the distance may permit the fixed element to absorb impact forces from an object without the object having substantial contact with the adjustable element. For example, a vehicle may have an encounter with a pedestrian, and the pliable surface of the fixed element may absorb the impact forces, without the pedestrian contacting the adjustable element.

As discussed above, the exterior vehicle adaptation system 692 may be configured to modify a position of the adjustable element based on one or more parameters. The one or more parameters may include vehicle parameters (e.g., velocity, number of occupants, location of occupants, location of the vehicle, etc.) and/or environmental parameters (e.g., detection of pedestrians, a time of day, a day of the week, weather considerations, relative speed of over vehicles, etc.). In various examples, the exterior vehicle adaptation system 692 may receive input from the sensor system 602, the localizer system 620, the perception system 622, and/or the planner system 648 to determine a status of the one or more parameters (e.g., determine whether a parameter is met). For example, the vehicle adaptation system may include a range of velocities associated with one or more positions of the adjustable element. A first range of 0-20 MPH may be associated with a retracted position, a second range of 21-35 MPH may be associated with a first extended position (e.g., 100 mm), and a third range of 36-65 MPH may be associated with a second extended position (e.g., 200 mm). Based on data from the sensor system 602 and/or the localizer system 620 indicating that the vehicle has accelerated from 15 MPH to 30 MPH, the vehicle adaptation system 692 may modify the position of the adjustable element to the first extended position.

The exterior vehicle adaptation system 692 may modify the position of the adjustable element via one or more actuators. The one or more actuators may be mechanical (e.g., scissor-drive actuator, screw-drive actuator, etc.), pneumatic, hydraulic, electric, electro-mechanical, magnetic, pyrotechnic, and/or other types of actuators. In various examples, the one or more actuators may be configured to modify a position of the adjustable element at an adjustable rate. For example, for normal operations, the actuator may be configured to deploy the adjustable element to a maximum extended position in 100 milliseconds, and in 60 milliseconds in an emergency situation. In such an example, the vehicle adaptation system may identify the emergency situation based on input from the sensor system 602, the localizer system 620, and/or the perception system 622, such as input indicating that an impact is imminent (e.g., closure rate of approaching vehicle exceeds a threshold closure rate).

In various examples, the exterior vehicle adaptation system 692 may include one type of actuator for actuation of the adjustable element, such as pneumatic actuator. In some examples, the exterior vehicle adaptation system 692 may include two types of actuators. In such examples, the vehicle adaptation system may include a first type of actuator, such as a pneumatic actuator, configured to extend and retract the adjustable element to various positions a plurality of times, and a second type of actuator, such as a pyrotechnic actuator, configured to rapidly extend the adjustable element, such as in an emergency. In such examples, the pyrotechnic actuator may be actuated based on a determination of imminent impact with another object and/or other emergency situation. For example, a vehicle traveling in a school zone may have a front and rear adjustable element in the retracted position. The vehicle adaptation system may receive an indication from a perception system 622 that another vehicle has a fast closure rate. The exterior vehicle adaptation system 692 may determine that an impact with the other vehicle is imminent and may send a signal to the pyrotechnic actuator to deploy the adjustable element to absorb the impact forces and protect vehicle occupants.

In some examples, the interior safety system 688 may include systems, such as, for example, an interior vehicle adaptation system 696 including an internal adaptive structure 698. The internal adaptive structure 698 may include an adjustable element, such as adjustable element 412. In various examples, the adjustable element may be coupled to two internal surfaces of a vehicle, such as between an external portion and an occupant portion of the vehicle. In such examples, the internal vehicle adaptation system 696 may be configured to adjust a rigidity of the adjustable element, to modify the rigidity of the vehicle (i.e., a body of the vehicle) and protect occupants and/or pedestrians and/or other living objects.

Based on input from one or more of the sensor system 602, the localizer system 620, the perception system 622, and/or the planner system 648, the interior vehicle adaptation system 696 may adjust a stiffness of the adjustable element. In some examples, the adjustable element may include a damper with one or more valves configured to open and close, in whole or in part, to adjust damping forces. In such examples, based on the input, the interior vehicle adaptation system 696 may adjust a position of the one or more valves to adjust the rigidity of the vehicle for the given scenario. For example, based on detection of a pedestrian by the perception system 622, the vehicle adaptation system may open the one or more valves to decrease a stiffness of the damper, and decrease the rigidity of the vehicle.

In some examples, the adjustable element may include an electromagnetic shock absorber (e.g., absorber with magnetorheological fluid). In such examples, based on the input, the internal vehicle adaptation system 696 may deliver a varying amount of electrical current to the electromagnetic shock absorber to adjust the stiffness of the adjustable element and therefore, the rigidity of the vehicle. For example, based on detection of a vehicle speed in excess of 45 MPH, the vehicle adaptation system may deliver a maximum amount of electrical current to the electromagnetic shock absorber to increase a stiffness of the shock absorber.

In various examples, the adjustable element may comprise a substantially rigid material configured to extend and retract via one or more actuators. In such examples, the internal vehicle adaptation system may adjust a position of the adjustable element based on input from the sensor system 602, the localizer system 620, the perception system 622, and/or the planner system 648. As depicted in FIG. 4, in an extended position, the adjustable element may be coupled between two inner surfaces of the vehicle (e.g., a frame and an inner surface of the skin, an occupant portion and an outer portion, etc.). In the extended position, the adjustable element may be configured to absorb high impact forces, such as those associated with a collision with another vehicle or other object that could threaten the safety of vehicle occupants. The adjustable element may be configured to collapse to absorb energy. Based on an impact force being transferred via an external portion of the vehicle (i.e., impact point), the adjustable element may absorb the impact force by structurally failing (e.g., collapsing). The structural failure and/or collapse of the adjustable element may substantially prevent impact forces from being transmitted to the internal section, thereby protecting occupants.

As discussed above, based on input from the sensor system 602, the localizer system 620, the perception system 622, and/or the planner system 648, the internal vehicle adaptation system 692 may modify a position of the adjustable element to a retracted position. In some examples, the determination to retract the adjustable element may be based on an increased likelihood of encounter with a pedestrian or other living object and/or a decreased likelihood of encounter with another vehicle. In the retracted position, the adjustable element may be coupled to one inner surface of the vehicle, such as an occupant portion, and may be decoupled from the second inner surface, such as the outer portion.

Additionally, the internal adaptive structure may include a fixed element, such as fixed element 410, 106. The fixed element may comprise a substantially pliable material, such as foam, rubber, plastic, silicone, soft or ductile metal, and/or another pliable material configured to absorb a first range of impact forces. In various examples, the fixed element may be configured to absorb the first range of impact forces with the adjustable element in the retracted position, and the adjustable element may be configured to absorb a second range of impact forces (e.g., larger forces than the first range) when the adjustable element is in the extended portion.

In various examples, the fixed element may be configured as a spring (e.g., helical spring, leaf spring, flat spring, etc.), with a spring constant (e.g., force deflection characteristic) configured to absorb the first range of impact forces (e.g., $1\times10^3$ N-$2\times10^5$ N). In various examples, the first range of impact forces may include a range of forces estimated for a physical encounter with a pedestrian, an animal, and/or other object with a low velocity differential (e.g., 10 MPH). For example, the fixed element may be configured to absorb forces applied to a surface of the vehicle, such as those associated with minor impacts with other vehicles (i.e., a fender bender).

Figure 7:
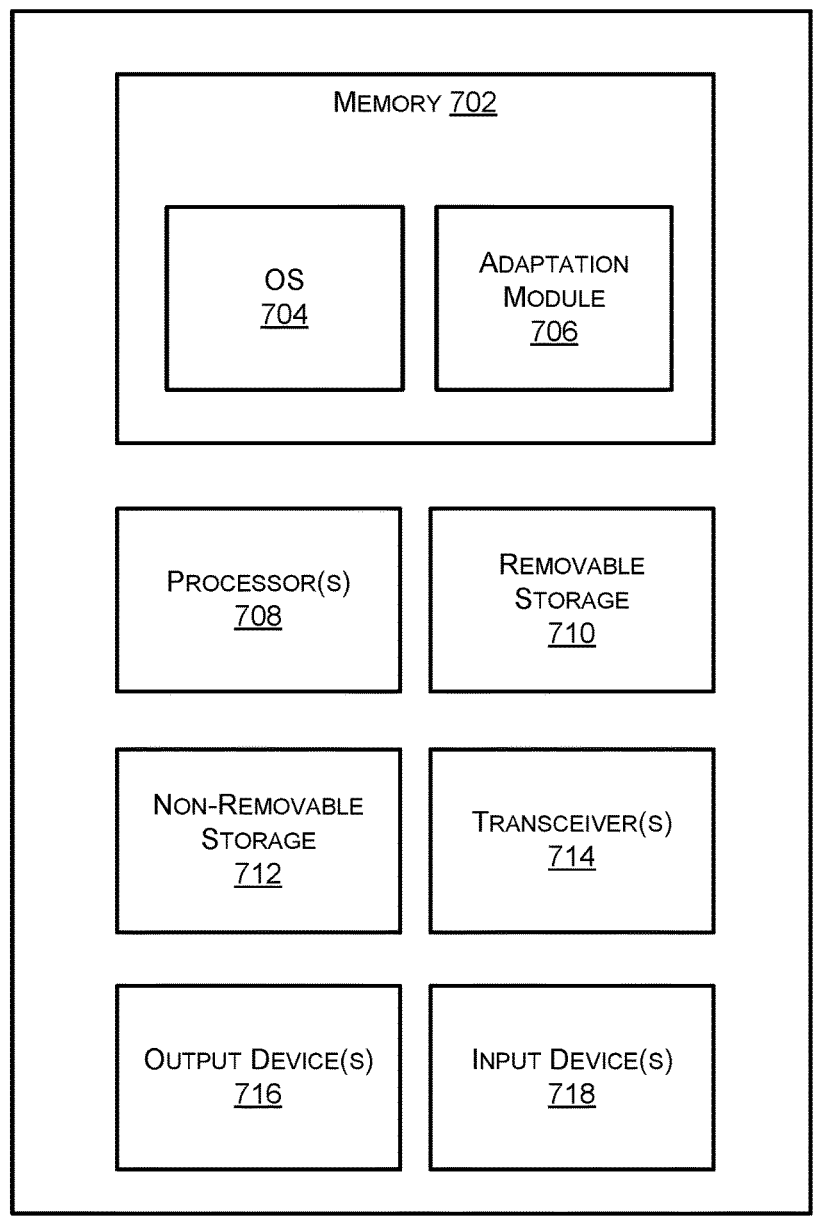
FIG. 7 is a block diagram showing example components of a computing system used to implement a vehicle adaptation system.

FIG. 7 is a block diagram of example components of an electronic device 700 for use in a vehicle adaptation system. The electronic device 700 may comprise a component of the operation control system 600, the vehicle control system 670, or other electronic components for use with the vehicle adaptation system (e.g., external vehicle adaptation system, internal vehicle adaptation system) described herein. The electronic device 700 may comprise a dedicated electronic device, such as a dedicated microcontroller, or may comprise a cell phone, smart phone, laptop, tablet, or other electronic device that comprises a number of components to gather data, communicate, and modify a vehicle rigidity, among other things, based on the data.

The electronic device 700 may comprise memory 702 configured to include computer-executable instructions including at least an operating system (OS) 704 for receiving data and controlling a vehicle and an adaptation module 706, among other things. The electronic device 700 may also include one or more processors 708, removable storage 710, non-removable storage 712, transceiver(s) 714, output device(s) 716, and input device(s) 718. Of course, in some examples, rather than being located in the electronic device 700, the OS 704 and/or adaptation module 706, or portions thereof, may be located on a remote server, on a passenger's electronic device (e.g., their cell phone), or in another component of the operation control system 600 or vehicle adaptation system.

In various implementations, the memory 702 may be volatile (such as random access memory, or RAM), non-volatile (such as read only memory, or ROM, flash memory, etc.), or some combination of the two. The memory 702 may also comprise the OS 704. As discussed below, the OS 704 may receive sensor data, provide adaptive structure interfaces, and communicate with other vehicles or a central control, and perform other functions related to the vehicle systems.

The memory 702 may also store incoming vehicle and/or object data from the vehicle's sensor system, such as sensor system 602 and, in some cases, from other vehicles (e.g., when operating multiple vehicles or platooning). As discussed above, the incoming vehicle data may also include video and still images, GPS coordinates, accelerometer readings, etc., from the various sensors on the vehicles. The incoming vehicle data may enable the electronic device 700 to adjust a rigidity of the vehicle in order to protect vehicle occupants, pedestrians and/or other living objects, among other things.

In some examples, the memory 702 may also include the adaptation module 706. As mentioned above, in some examples, the vehicle may process vehicle and/or object data from the vehicle's sensor system. In some examples, based on the vehicle and/or object data, the adaptation module 706 may determine whether to modify the rigidity of the vehicle.

To this end, the adaptation module 706 may include algorithms related to modifying the rigidity of the vehicle. As described above, the determination to modify the rigidity may be based on one or more vehicle and/or environmental parameters. In some examples, the determination may be based on a condition associated with one of the one or more parameters being met (e.g., satisfied). In such examples, the adaptation module 706 may include a simple algorithm configured to determine when a triggering event has occurred (e.g., parameter met). In various examples, the determination may be based on a calculated likelihood of encounter with a pedestrian and/or another vehicle and/or a likelihood of injury to the pedestrian and/or vehicle occupant. In such examples, the adaptation module 706 may include a complex algorithm configured to determine the likelihood of encounter and/or likelihood of injury based on the one or more parameters. In some examples, the adaptation module 706 may assign weights (fixed and/or variable) to the one or more factors to assist in calculating the likelihood of encounter and/or likelihood of injury.

In some implementations, the processor(s) 708 may comprise one or more central processing units (CPUs), one or more graphics processing units (GPUs), or some combination of CPUs and GPUs, or any other sort of processing unit. The processor(s) 708 may be responsible for running software on the electronic device 700, including the OS 704 and adaptation module 706, and to interpret and send messages to the central server, if applicable. In some examples, the processor(s) 708 may also perform calculations and provide instructions based on data from the sensor system, such as sensor system 602, for example, and various input device(s) 718.

The electronic device 700 may also include additional data storage devices (removable and/or non-removable) such as, for example, magnetic disks, optical disks, or tape. Such additional storage is illustrated in FIG. 7 by removable storage 710 and non-removable storage 712. The removable storage 710 and non-removable storage 712 may store the various modules, programs, passenger interfaces, and algorithms for the OS 704 and adaptation module 706, among other things.

Non-transitory computer-readable media may include volatile and nonvolatile, removable and non-removable tangible, physical media implemented in technology for storage of information, such as computer readable instructions, data structures, program modules, or other data. The memory 702, removable storage 710, and non-removable storage 712 are all examples of non-transitory computer-readable media. Non-transitory computer-readable media include, but are not limited to, RAM, ROM, electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the electronic device 700. Any such non-transitory computer-readable media may be part of the electronic device 700 or may be a separate device (e.g., a jump drive) or a separate database or databank (e.g. at a central server).

In some examples, the transceiver(s) 714 may include any sort of transceivers known in the art. The transceiver(s) 714 may include, for example, wireless modem(s) to facilitate wireless connectivity with the other vehicles, a remote server (if applicable), the Internet, and/or an intranet. Further, the transceiver(s) 714 may include a radio transceiver that performs the function of transmitting and receiving radio frequency communications via an antenna (e.g., cellular, Wi-Fi, or Bluetooth®).

In some examples, the output device(s) 716 may include any sort of output devices known in the art, such as the displays (e.g., a liquid crystal display (LCD), light emitting diode (LED) display, or thin film transistor (TFT) screen), a touchscreen display, lights, speakers, a vibrating mechanism, or a tactile feedback mechanism to provide interactive feedback to the passenger. In some examples, the output device(s) 716 may play various sounds, such as, for example, sounds intended to alert a passenger to an impending maneuver or collision. Output device(s) 716 may also include ports for one or more peripheral devices, such as headphones, peripheral speakers, or a peripheral display to provide feedback to passengers, for example.

In various implementations, input device(s) 718 may include any sort of input devices known in the art. For example, input device(s) 718 may include a microphone, a keyboard/keypad/touchpad, a touch-sensitive display, a proximity sensor, gyroscope, accelerometer, altimeter, and other sensors. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input device(s) 718 may also include communication ports to receive data from external sensors or cameras, among other things.

In some examples, the vehicle adaptation system may comprise one or more input device(s) 718 mounted in the electronic device 700 or connected to the electronic device 700 during installation. In some examples, some of the input device(s) 700 may be housed in the electronic device 700 and the rest of the input device(s) 700 may be installed on the vehicle and connected to the electronic device 700 (e.g., using a wired or wireless connection). This can enable some or all of the vehicle adaptation system to be installed on vehicles as an aftermarket installation.

Those skilled in the art will appreciate that the electronic device 700 is merely illustrative and is not intended to limit the scope of the present disclosure. In particular, the electronic device 700 and devices described may include any combination of hardware or software that may perform the indicated functions, including computers, network devices, internet appliances, tablet computers, PDAs, wireless phones, pagers, etc. The electronic device 700 may also be connected to other devices, such as a vehicle control system of an autonomous vehicle, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other examples, some or all of the software components may execute in memory on another device and communicate with the illustrated electronic device 700. Some or all of the system components or data structures may also be stored (e.g., as instructions or structured data) on a non-transitory, computer-accessible medium or a portable article to be read by an appropriate drive, various examples of which are described above. In some examples, instructions stored on a computer-accessible medium separate from the electronic device 700 may be transmitted to the computing system via transmission media or signals such as electrical, electromagnetic, or digital signals, conveyed via a communication medium such as a wireless link. Various examples may further include receiving, sending or storing instructions and/or data implemented in accordance with the foregoing description on a computer-accessible medium. Accordingly, the techniques described herein may be practiced with other computing system configurations.

Figure 8:
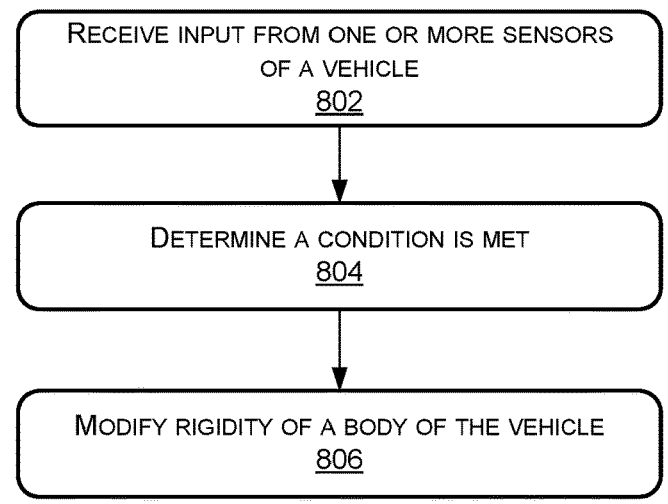
FIG. 8 is a flow diagram of an example process for modifying rigidity of a vehicle using a vehicle adaptation system.
Figure 9:
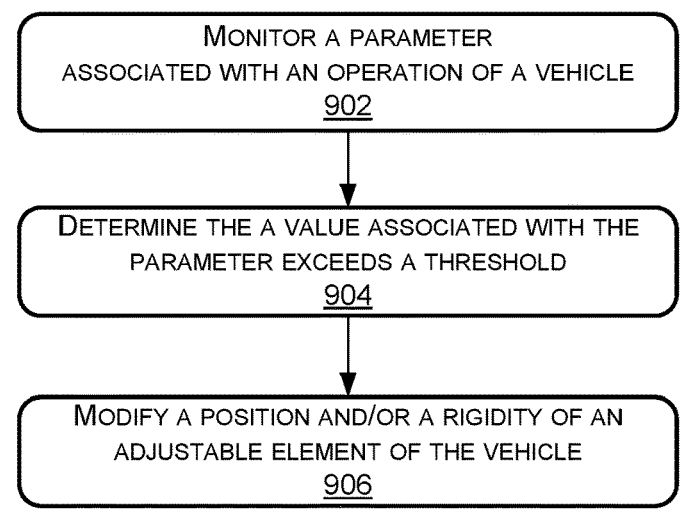
FIG. 9 is flow diagram of an example process for modifying a position of an adjustable element of a vehicle.

FIGS. 8 and 9 are flow diagrams of example processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 8 is a flow diagram of an illustrative process 800 for modifying a rigidity of a vehicle using a vehicle adaptation system. The process 800 may be performed by the systems described above, or via alternative systems.

At step 802, the vehicle adaptation system receives input from one or more sensors of a vehicle, such as vehicle 102. The input may include data related to one or more vehicle and/or environmental parameters associated with the vehicle. The one or more sensors may include cameras, motion detectors or sensors, wheel encoders, light detection and ranging (LIDAR), radio detection and ranging (RADAR), global positioning system (GPS), microphones, environmental sensors (e.g., ambient temperature gauge, road surface temperature gauge, humidity sensor, and barometric pressure sensor, etc.), and/or other sensors configured to detect data related to one or more parameters.

In various examples, the vehicle adaptation system may analyze, process, and/or manipulate data from the one or more sensors. In such examples, the vehicle adaptation system may detect an object and/or determine a track, velocity, classification, etc. thereof. In some examples, the vehicle adaptation system may assign data from a sensor to a particular parameter. For example, data from a motion sensor may be assigned to a vehicle velocity parameter.

In some examples, step 802 may correspond to the adjustable element being in a current (e.g., real-time) position and/or stiffness setting. In various examples, step 802 may correspond to the adjustable element being in a primary (e.g., wait, default, etc.) position and/or stiffness setting. The primary position of the adjustable element may include a retracted position or an extended position. The primary stiffness setting of the adjustable element may include a soft setting or a rigid setting. For example, a primary position of an adjustable element of a vehicle bumper may be a retracted position.

At step 804, the vehicle adaptation system determines that a condition corresponding to the parameter is met. In some examples, the condition may be a binary condition. In such examples, the existence of a parameter, such as detection of a pedestrian, may be sufficient to determine the condition is met.

In some examples, the vehicle adaptation system may assign a weight to the data corresponding to each parameter. The vehicle adaptation system may compare the parameter weight with a threshold weight associated with the parameter. Based on the comparison, the vehicle adaptation system may determine whether the condition is met. For example, the vehicle adaptation system may determine that a weight associated with a vehicle velocity exceeds a threshold velocity, and therefore, a condition to modify the vehicle rigidity is met.

In various examples, the vehicle adaptation system may monitor conditions and/or parameters based on the primary and/or a current position and/or stiffness setting of the adjustable element. In such examples, the vehicle adaptation system may monitor conditions corresponding to an adjustment from the primary and/or current position and/or stiffness setting. For example, the vehicle bumper described above may be in a retracted position corresponding to a primary or default setting. The vehicle adaptation system may thus monitor a location of the vehicle corresponding to an extension position, a speed of the vehicle exceeding a threshold, and/or other conditions corresponding to the extended position.

In various examples, the condition may include a condition corresponding to adjusting the position and/or stiffness setting of the adjustable element from a current position and/or stiffness setting to a primary position and/or stiffness setting. In such examples, the determination at step 804 may include a determination that the condition to modify the position from the primary position and/or stiffness setting no longer exists. Continuing the example from above, the vehicle bumper may currently be in an extended position with a primary position as the retracted position. The vehicle adaptation system may determine, at 804, that the condition that led to the extension no longer exists.

At step 806, the vehicle adaptation system modifies a vehicle rigidity based on a determination that the condition is met. The vehicle adaptation system may modify the vehicle rigidity by extending or retracting one or more adjustable elements, such as adjustable element 108 or adjustable element 412. In various examples, a first set of parameters and a value thereof (e.g., pedestrian detected, low velocity) may be associated with a retraction of the adjustable element, and a second set of parameters and a value thereof (e.g., high velocity, imminent impact detected) may be associated with an extension of the adjustable element. In some examples, the length of extension may be determined based upon one or more parameters, such as the velocity.

In various examples, the modification of the rigidity may include an adjustment of the position and/or stiffness setting of the adjustable element from a primary position and/or stiffness setting. In some examples, the modification of the rigidity may include an adjustment of the position and/or stiffness setting of the adjustable element back to the primary position and/or stiffness setting. Accordingly, the vehicle adaptation system may be configured to continually modify the rigidity of the vehicle body based on changing conditions in the environment.

FIG. 9 is a flow diagram of an illustrative process 900 for modifying a position of an adjustable element of a vehicle. The process 900 may be performed by the systems described above, or via alternative systems.

At step 902, the vehicle adaptation system monitors a parameter associated with an operation of a vehicle. The parameter may be a vehicle factor and/or an environmental factor. In various examples, the vehicle adaptation system may monitor the parameter by analyzing input from one or more sensors on the vehicle. Additionally, the vehicle adaptation system may monitor the parameter by analyzing input from an external source, such as a remote service, second vehicle, or the like, via a network.

In various examples, the parameter may be monitored based on a current and/or primary position and/or stiffness setting of the adjustable element. In such examples, the parameter may correspond to an adjustment to or from the primary position and/or stiffness setting.

At step 904, the vehicle adaptation system determines the value associated with the parameter exceeds a threshold. In various examples, a threshold value may be based on the current and/or primary position and/or stiffness setting of the adjustable element. In such examples, the threshold value may be based on an adjustment of the adjustable element to or from the current and/or primary position and/or stiffness setting. In some examples, the value may be based on a binary determination. In such examples, the value of 1 may determine that the parameter exists. In various examples, the value may be based on a range associated with the parameter. For example, a velocity parameter may be valued at "1" with a velocity between 25-30 MPH, and "2" between 31-35 MPH, etc. In some examples, the value may be a direct value associated with the parameter. For example, the velocity of 25 MPH may be assigned a value of "25."

In various examples, the threshold values associated with parameters may be stored on a storage of a computing device of the vehicle adaptation system. In some examples, the threshold values associated with the parameters may be stored on an external data store. In such examples, the vehicle adaptation system may access the threshold values via a network interface.

At step 906, the vehicle adaptation system modifies a position and/or a rigidity of an adjustable element of the vehicle. The modification of the position may be to a retracted position or an extended position. The modification of the rigidity may be to a softer or harder stiffness setting. In various examples, the modification of the rigidity may be to one of a plurality of rigidity settings. In such examples, the particular rigidity setting may be based on a value associated with the parameter. In some examples, the modification of the position may be to one of a plurality of extended positions. In such examples, the particular extended position may be based on a value associated with the parameter. For example, a first range of velocities may be associated with a first extended position, and a second range of velocities may be associated with a second extended position. The vehicle adaptation system may modify the position of the adjustable element via one or more actuators. The one or more actuators may be fixed rate actuators or variable rate actuators. In examples with variable rate actuators, the rate at which the actuators extend or retract the adjustable element may be based on a value of a parameter and/or the existence of a condition.

In various examples, the modification of the position and/or the rigidity of the adjustable element may include an adjustment of the position and/or stiffness setting of the adjustable element from a primary position and/or stiffness setting. In some examples, the modification of the position and/or the rigidity may include an adjustment of the position and/or stiffness setting of the adjustable element back to the primary position and/or stiffness setting. Accordingly, the vehicle adaptation system may be configured to continually adjust the position and/or stiffness of the adjustable element based on changing conditions in the environment.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for modifying the rigidity of a vehicle have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A vehicle comprising:
a body;
a sensor coupled to the body to sense a condition;
an adaptive structure coupled to the body to adjust a rigidity of the body;
one or more processors; and
one or more non-transitory computer readable media storing computer-executable instructions that, when executed by the one or more processors, cause the one or more processors to perform operations comprising:
receiving input from the sensor of the vehicle;
determining that a value of the input exceeds a threshold value associated with a parameter; and
modifying the rigidity of the body by actuating the adaptive structure of the vehicle, based at least in part on the input, wherein the modifying the rigidity of the vehicle is based at least in part on the determining that the value exceeds the threshold value.

2. The vehicle as claim 1 recites, wherein the modifying the rigidity of the body of the vehicle comprises at least one of:
adjusting a position of an internal adjustable element of the adaptive structure, the internal adjustable element being coupled to an internal surface of the body of the vehicle; or
adjusting a position of an external adjustable element of the adaptive structure, the external adjustable element being coupled to an external surface of the body of the vehicle.

3. The vehicle as claim 1 recites, the operations further comprising:
extending the adaptive structure responsive to the input indicating a first condition; or
retracting the adaptive structure responsive to the input indicating a second condition.

4. The vehicle as claim 3 recites, wherein the first condition comprises at least one of:
a speed of the vehicle above a threshold speed;
an absence of detection of a living object; or
a location of the vehicle.

5. The vehicle as claim 3 recites, wherein the second condition comprises at least one of:
a speed of the vehicle below a threshold speed;
a detection of a living object; or
a location of the vehicle.

6. The vehicle as claim 1 recites, the operations further comprising processing the input to predict an impact with an object, the processing comprising:
identifying the object;
classifying the object;
tracking the object; and
determining a closure rate between the vehicle and the object exceeds a threshold closure rate,
wherein the modifying the rigidity of the vehicle is based at least in part on the closure rate exceeding the threshold closure rate.

7. The vehicle as claim 1 recites, wherein the modifying the rigidity of the body of the vehicle comprises at least one of:
opening or closing a valve of a damper to adjust a stiffness of the adaptive structure;
activating an actuator to extend or retract the adaptive structure; or
adjusting a stiffness of an electromagnetic shock absorber.

8. A method comprising:
receiving input from one or more sensors of a vehicle;
determining, based at least in part on the input, that a velocity of the vehicle is within a first velocity range;
determining, based at least in part on the input, that a condition is met; and
modifying a rigidity of a body of the vehicle based at least in part on the condition being met, wherein the modifying the rigidity comprises adjusting a position of an adjustable element to a first extended position, the first extended position being based at least in part on the first velocity range.

9. The method as claim 8 recites, wherein the condition is further based at least in part on at least one of:
a location of the vehicle;
or
a detection of a pedestrian in proximity to the vehicle.

10. The method as claim 9 recites, wherein the input comprises one or more images and the detection of the pedestrian comprises:
receiving the one or more images;
detecting an object in the one or more images;
classifying the object as the pedestrian; and
determining a distance to the pedestrian is within a threshold distance.

11. The method as claim 8 recites, wherein the modifying the rigidity of the vehicle comprises at least one of:
adjusting a position of an internal adjustable element, the internal adjustable element being coupled to an internal surface of the vehicle; or
adjusting a position of an external adjustable element, the external adjustable element being coupled to an external surface of the vehicle.

12. The method as claim 8 recites, wherein the input comprises an indication that a pedestrian is in proximity to the vehicle and the modifying the rigidity comprises adjusting a position of an internal or external adjustable element from an extended position to a retracted position, wherein an outer surface of a fixed element extends a distance beyond an outer surface of the internal or external adjustable element.

13. The method as claim 8 recites, wherein the receiving the input comprises receiving a first input, the method further comprising:
receiving a second input;
determining, based at least in part on the second input, that the velocity of the vehicle is within a second velocity range; and
adjusting the position of the adjustable element to a second extended position, the second extended position corresponding to the second velocity range.

14. The method as claim 13 recites, wherein the adjustable element is configured to absorb a first range of impact forces in the first extended position and a second range of impact forces in the second extended position.

15. The method as claim 8 recites, wherein
an outer surface of the adjustable element extends a distance beyond an outer surface of a fixed element in the first extended position.

16. The method as claim 15 recites, wherein the distance is at least about 25 mm to at most about 200 mm.

17. The method as claim 8 recites, wherein the modifying the rigidity of the vehicle comprises activating an actuator to extend or retract the adjustable element.

18. The method as claim 8 recites, wherein the modifying the rigidity of the vehicle further comprises opening or closing a valve of a damper to adjust a stiffness of the adjustable element.

19. The method as claim 8 recites, wherein the modifying the rigidity of the vehicle further comprises adjusting a stiffness of an electromagnetic shock absorber.

20. An adaptive structure for modifying a rigidity of a vehicle body, the adaptive structure comprising:
a fixed element coupled to the vehicle body and configured to absorb a first range of forces;
an adjustable element coupled to the vehicle body and configured to absorb a second range of forces, the second range of forces being greater than the first range of forces; and
an actuator coupled to the adjustable element and configured to modify the rigidity of the vehicle body by modifying a position of the adjustable element between a retracted position and an extended position.

21. The adaptive structure as claim 20 recites, wherein the actuator is configured to modify the position of the adjustable element based on one or more parameters associated with an operation of a vehicle.

22. The adaptive structure as claim 21 recites, wherein the one or more parameters comprise at least one of:
a velocity of the vehicle;
a location of the vehicle;
a time of day;
a weather condition;
a closure rate between the vehicle and a detected object;
a classification associated with the detected object; or
a detection of a pedestrian in proximity to the vehicle.

23. The adaptive structure as claim 20 recites, wherein the fixed element comprises a bumper mounted to an external surface of the vehicle body, and the adjustable element is movable between the retracted position in which the adjustable element is housed in an opening of the fixed element to the extended position in which an outer surface of the adjustable element extends a distance beyond an outer surface of the fixed element.

24. The adaptive structure as claim 23 recites, wherein the distance is at least about 50 mm to at most about 250 mm.

25. The adaptive structure as claim 20 recites, wherein the fixed element is mounted between a first internal surface and a second internal surface of the vehicle body, and a first end of the adjustable element is coupled to the first internal surface, the adjustable element being moveable between the extended position in which a second end of the adjustable element is coupled to the second internal surface to the retracted position in which the second end of the adjustable element is not coupled to the second internal surface.

26. The adaptive structure as claim 25 recites, wherein the first internal surface is a surface of an occupant portion of the vehicle body and the second internal surface is a surface of an external portion of the vehicle body.

27. The adaptive structure as claim 20 recites, wherein the fixed element and the adjustable element are coupled to at least one of:
a front surface of the vehicle body;
a rear surface of the vehicle body; or
a side surface of the vehicle body.

28. The adaptive structure as claim 20 recites, wherein the fixed element comprises a pliable material and the adjustable element comprises a rigid material.

29. The adaptive structure as claim 20 recites, wherein the fixed element comprises a rigid material and the adjustable element comprises a pliable material.

* * * * *